(12) United States Patent
Diedrich et al.

(10) Patent No.: US 11,741,747 B2
(45) Date of Patent: Aug. 29, 2023

(54) MATERIAL SPECTROSCOPY

(71) Applicant: Ford Global Technologies, LLC, Dearborn, MI (US)

(72) Inventors: Jonathan Diedrich, Carleton, MI (US); Ali Hassani, Ann Arbor, MI (US); Hamid M. Golgiri, Livonia, MI (US); Hemanth Yadav Aradhyula, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 17/147,902

(22) Filed: Jan. 13, 2021

(65) Prior Publication Data

US 2022/0222464 A1 Jul. 14, 2022

(51) Int. Cl.
*G06V 40/16* (2022.01)
*G06V 10/75* (2022.01)
(Continued)

(52) U.S. Cl.
CPC .......... *G06V 40/162* (2022.01); *G06V 10/751* (2022.01); *G06V 20/58* (2022.01); *G06V 20/64* (2022.01); *G06V 40/169* (2022.01)

(58) Field of Classification Search
CPC .... G06V 40/162; G06V 10/751; G06V 20/58; G06V 20/64; G06V 40/169;
(Continued)

(56) References Cited

U.S. PATENT DOCUMENTS 8,218,862 B2 7/2012 Demirli et al.
9,298,974 B1 3/2016 Kuo et al.
(Continued)

FOREIGN PATENT DOCUMENTS

CN 106407875 A 2/2017
CN 109558840 A 4/2019
(Continued)

OTHER PUBLICATIONS

Kim, S., et al., "Environmental illumination invariant face recognition using near infrared imaging system." IEEE Conference Publication, 2015, 12 pages.
(Continued)

*Primary Examiner* — Phuoc Tran
(74) *Attorney, Agent, or Firm* — Frank Lollo; Bejin Bieneman PLC

(57) ABSTRACT

A computer, including a processor and a memory, the memory including instructions to be executed by the processor to acquire a first image by illuminating a first object with a first light beam, determine a first measure of pixel values in the image and perform a comparison of the first measure of pixel values to a second measure of pixel values determined from a second image of a second object, wherein the second image is previously acquired by illuminating the second object with a second light beam. The instructions include further instructions to, when the comparison determines that the first measure is equal to the second measure of pixel values within a tolerance, determine that the first object and the second object are a same object.

20 Claims, 14 Drawing Sheets

(51) Int. Cl.
*G06V 20/58* (2022.01)
*G06V 20/64* (2022.01)

(58) Field of Classification Search
CPC .... G06V 10/145; G06V 20/59; G06V 40/166; G06V 40/172; G06V 40/45; G06V 10/143; G06F 18/214; G06F 18/22; G06N 3/04; G06N 3/08
See application file for complete search history.

(56) References Cited

U.S. PATENT DOCUMENTS

| | | | |
|---|---|---|---|
| 9,524,421 | B2 | 12/2016 | Ross et al. |
| 9,582,879 | B2 | 2/2017 | Cheng et al. |
| 9,767,358 | B2 | 9/2017 | Xue et al. |
| 9,892,306 | B2 | 2/2018 | Hillmann et al. |
| 10,452,894 | B2 | 10/2019 | Zhang et al. |
| 10,652,749 | B2 | 5/2020 | Derakhshani |
| 10,685,251 | B2 | 6/2020 | Ionita |
| 2006/0104488 | A1* | 5/2006 | Bazakos .............. G06V 40/166 382/118 |
| 2012/0263361 | A1 | 10/2012 | Boettger et al. |
| 2013/0114853 | A1 | 5/2013 | Sengupta et al. |
| 2016/0019420 | A1 | 1/2016 | Feng et al. |
| 2019/0286927 | A1* | 9/2019 | Ionita .................. G06V 40/167 |
| 2019/0369212 | A1 | 12/2019 | Dylewski |
| 2019/0392189 | A1 | 12/2019 | Kumar et al. |
| 2020/0134345 | A1 | 4/2020 | Joshi et al. |
| 2020/0394390 | A1 | 12/2020 | Zhang et al. |
| 2021/0397817 | A1 | 12/2021 | Su et al. |

FOREIGN PATENT DOCUMENTS

| | | |
|---|---|---|
| CN | 110443102 A | 11/2019 |
| CN | 110516576 A | 11/2019 |
| CN | 111523344 A | 8/2020 |
| EP | 3961561 A1 | 3/2022 |
| FR | 3078793 A1 | 3/2018 |
| JP | 2007257087 A | 10/2007 |
| JP | 201027699 A | 4/2010 |
| JP | 2019217978 A | 12/2019 |
| WO | 2013131407 A1 | 9/2013 |
| WO | 2017192719 A1 | 11/2017 |
| WO | 2018086543 A1 | 5/2018 |
| WO | 2018127789 A1 | 7/2018 |
| WO | 2019207557 A1 | 10/2019 |

OTHER PUBLICATIONS

Notice of Allowance for U.S. Appl. No. 17/147,807, filed Jan. 13, 2021, as issued by the USPTO dated Feb. 9, 2023.

Non-Final Office Action for U.S. Appl. No. 17/147,807 as issued by the USPTO dated Sep. 6, 2022.

Non-Final Office Action for U.S. Appl. No. 17/147,832 as issued by the USPTO dated May 23, 2022.

Final Office Action for U.S. Appl. No. 17/147,832, filed Jan. 13, 2021, as issued by the USPTO dated Jun. 5, 2023.

* cited by examiner

MATERIAL SPECTROSCOPY

BACKGROUND

Vehicles can be equipped with computing devices, networks, sensors, and controllers to acquire and/or process data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
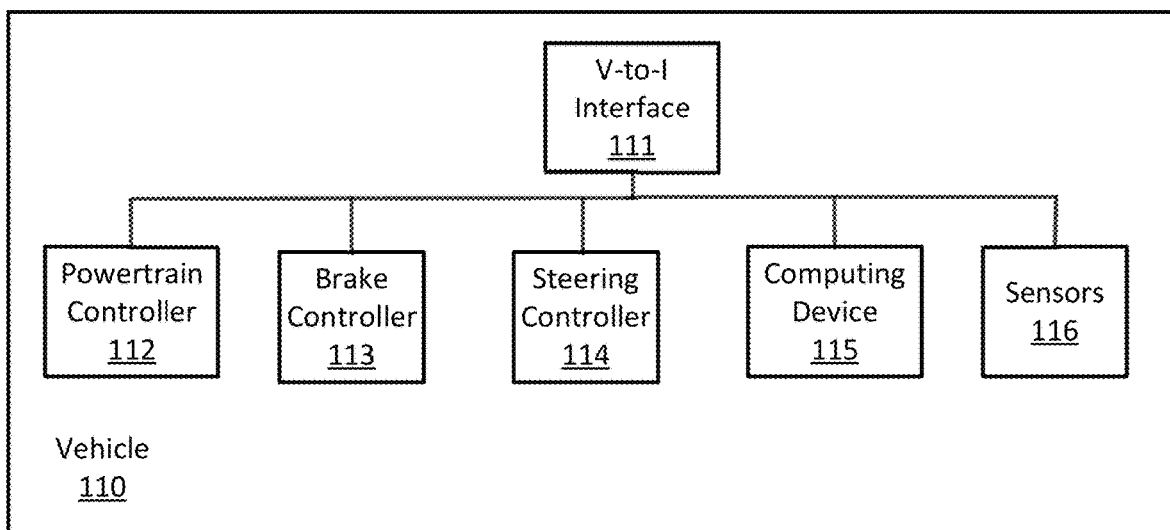
FIG. 1 is a diagram of an example vehicle.

A computing device in a traffic infrastructure system can be programmed to acquire data regarding the external environment of a vehicle and to use the data to operate the vehicle. For example, a camera in a vehicle can be programmed to acquire an image of a human approaching the vehicle and, upon determining the identity of the human based on facial recognition software, unlock the vehicle's doors to permit the operator to enter the vehicle. Likewise, cameras included in the interior of the vehicle can acquire one or more images of a human and, upon determining the identity of the operator based on facial recognition software, accept commands from the human to operate the vehicle.

A computing device in a vehicle can be programmed to perform facial recognition of a human by first acquiring a trained model during enrollment, where an image of the human face to be identified is acquired. The computing device can then acquire a challenge image that includes a human face and process the challenge image to determine whether the challenge image includes a human face that matches the trained model. Facial recognition is a type of biometric authentication, where human body measurements are used to determine an identity of a human to perform access control. Biometric authentication can be used to control access to buildings, homes, or vehicles, and can be used to grant permission to operate computers, phones, or other devices. Biometric authentication software can be executed on a computing device included in the location or device being accessed, or the image data can be uploaded to a cloud-based server that maintains a database of trained models for execution. The results of performing the biometric authentication can be downloaded to the device seeking authentication and permission to operate or access the location or device can be granted or denied.

Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match.

An issue with biometric facial recognition is "spoofing." Spoofing occurs when a non-authorized user seeks to gain access to a location or device using a fraudulent version of an authorized user's facial features. Fraudulent versions of an authorized user's facial features can include color photographs, for example. Biometric facial recognition systems can use three-dimensional sensors such as laser range detectors or lidars to prevent a non-authorized user from using a flat, two-dimensional photograph to spoof the system. Non-authorized users have attempted to circumvent biometric facial recognition systems by using three-dimensional (3D) masks that conform a user's general facial shape while including facial features belonging to an authorized user. These masks can range from inexpensive printed LYCRA® face masks to custom-made silicon face masks used in motion pictures, for example.

Techniques discussed herein improve biometric facial recognition by using spectral characteristics of human facial features to authenticate liveness in acquired image data. Liveness means that image data represents an actual (and not a spoofed) human face. Liveness authentication means distinguishing between a live human face and fraudulent versions including 3D masks in acquired near infrared (NIR) images. These techniques illuminate the challenge human face with NIR illumination and acquire an image with an image sensor that includes red, green, blue and NIR sensing elements to form a red, green, blue (RGB)/NIR image by acquiring near infrared pixels, red pixels, and blue pixels. An RGB/NIR image is also referred to as a color image herein. The RGB/NIR or color image can be illuminated with both NIR light and white light or illuminated with NIR light and ambient light. The NIR and RGB response is analyzed to determine whether a face in the challenge image belongs to a live human or a fraudulent reproduction. If it is determined that the face belongs to a live human, the challenge image is passed onto biometric facial recognition system for further processing, otherwise access is denied. Technique discussed herein can compensate for differences in ambient illumination, determine liveness based on segmenting the challenge image, and compensate for differences in distance from the sensor. Techniques discussed herein can be used to determine properties of materials in addition to human faces. Spectral properties of near infrared images can be used to distinguish real from counterfeit goods by distinguishing real leather from imitation leather, for example. In another example, a manufacturing application could determine that parts being installed in a product such as a vehicle are made of the correct material. In other examples, photographs of materials can be distinguished from near infrared images of the actual materials to verify goods for sale over the Internet.

FIG. 1 is a diagram of a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate and/or monitor the vehicle 110 in an autonomous mode, a semi-autonomous mode, or a non-autonomous mode, i.e., can control and/or monitor operation of the vehicle 110, including controlling and/or monitoring components of the vehicle including as described hereinbelow.

The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®)) or cellular networks. V-to-I interface 111 may accordingly include processors, memory, transceivers, etc., configured to utilize various wired and/or wireless networking technologies, e.g., cellular, BLUETOOTH®, Ultra-Wide Band (UWB),® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to share data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
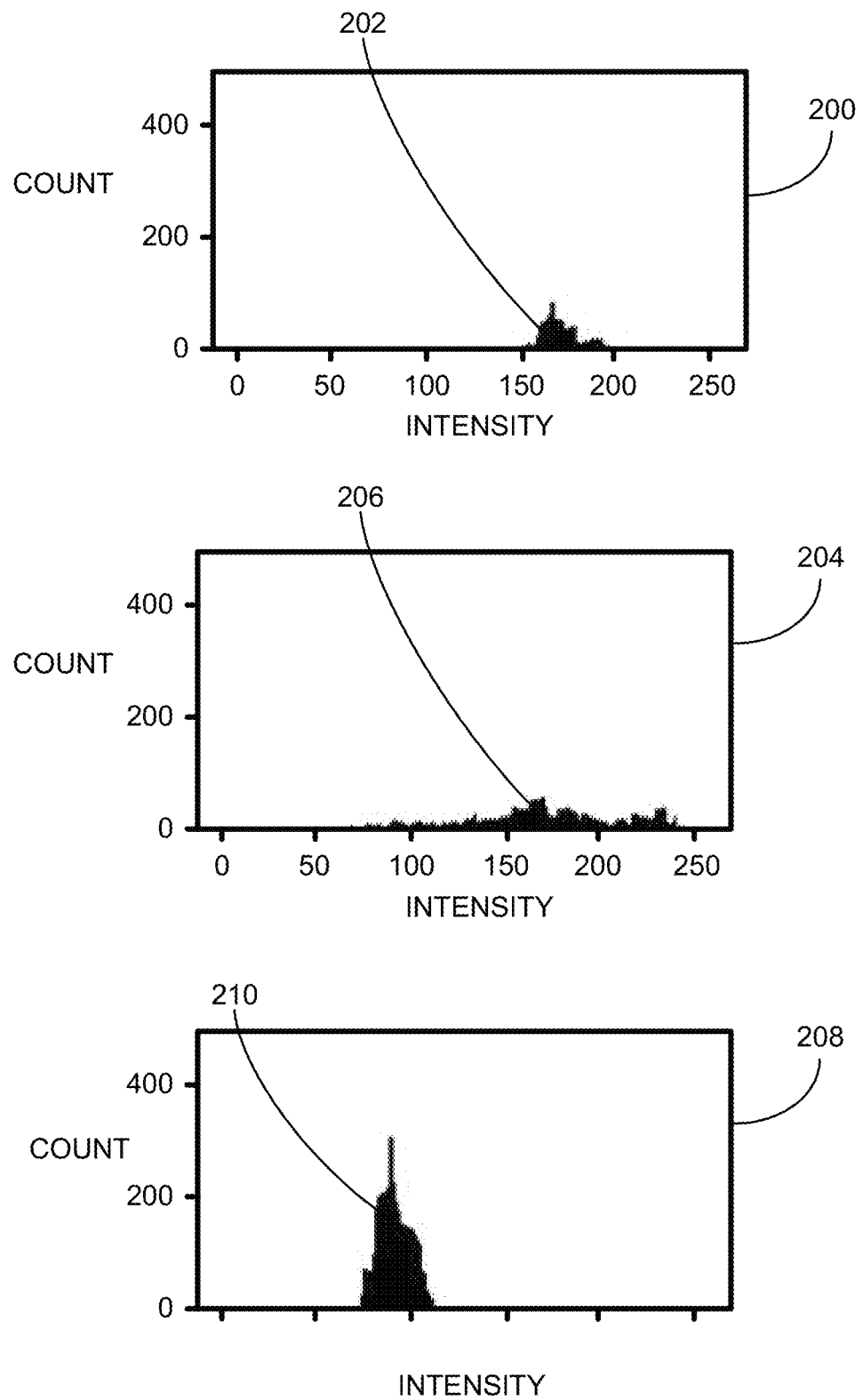
FIG. 2 is a diagram of example near infrared image histograms.

FIG. 2 is a diagram of three histograms 200, 204, 208 of image pixel intensity. Histograms discussed herein, including the histograms 200, 204, 208 display, for respective images, a measure of pixel values of various intensities in the image, e.g., the histograms 200, 204, 208 are formed or generated by counting the number of pixels at each pixel intensity in an image and plotting the counted number of pixels on the Y-axis (COUNT) against the pixel intensities on the X-axis (INTENSITY). The images from which the histograms 200, 204, 208 are determined are acquired by illuminating a scene with a near infrared (NIR) light. NIR light has a wavelength of between 800 and 2,500 nanometers (nm). In this example the NIR light can have a wavelength of about 850 nm or 940 nm. The NIR light can be acquired with a camera that includes a solid-state sensor that is sensitive to NIR light. Solid-state sensors manufactured using CMOS technology are naturally sensitive to NIR light and typically require an infrared blocking optical filter if NIR light is unwanted. Sensors are available that includes RGB filtered photo sites in addition to unfiltered photo sites in a mosaic arrangement to produce image that include RGB and NIR pixels. Still image cameras and video cameras can include RGB-NIR filters to produce RGB-NIR images. The resulting RGB-NIR images can be displayed to produce a sum of visible (RGB) and NIR pixels or the NIR pixels can be extracted to form an NIR image.

Techniques discussed herein include illuminating a scene with an NIR light and acquiring an image of the illuminated scene with CMOS sensor configured to acquire NIR light. Techniques discussed herein will also work with other types of illumination and other types of sensors. For example, the scene can be illuminated with one or more wavelengths of visible light and an image acquired using an unmodified RGB image sensor. Any wavelength of short wave infrared (SWIR) light can be used with the techniques discussed herein. SWIR light refers to infrared light that is reflected by objects as opposed to long wavelength infrared, which can be emitted by objects. The infrared wavelengths discussed above are employed because they can be emitted, focused and acquired using relatively inexpensive lights, lenses and sensors and tend to have less competing ambient illumination.

Histograms 200, 204, 208 were generated from an image of a live human face, a picture of a human face, and a modified picture of a human face, respectively. Analysis of the distribution of pixel counts 202, 206, 210 in each of the histograms 200, 204, 208 can distinguish between a live human face, a picture of a human face, and a modified picture of a human face. Analysis of the distribution of pixels counts 202, 206, 210 can be performed by assuming that the distributions are Gaussian, and fitting a Gaussian distribution to the distributions of pixel counts 202, 206, 210. A Gaussian distribution G is described in terms of its mean value m, standard deviation σ and height a by the formula:

$$G = f(x) = a \cdot \exp\left(-\frac{(x-m)^2}{2\sigma^2}\right) \quad (1)$$

Fitting a Gaussian curve determines the parameters of m, σ, and a that minimize a sum of squared differences between the Gaussian curve and the distribution of pixel counts 202, 204, 206.

Additional parameters that can be determined based on a Gaussian curve are skewness and kurtosis. Skewness is a parameter that measures the symmetry of count data with respect to the mean m. Skewness compares the mass of count data included in the Gaussian curve on either side of the mean m. Skewness can be measured by determining the third standardized moment $\bar{\mu}_3$ about the mean m as determined by the equation:

$$\bar{\mu}_3 = E\left[\left(\frac{G-m}{\sigma}\right)^3\right] \quad (2)$$

Where E is the expectation operator, G is the Gaussian distribution, m is the mean and σ is the standard deviation as above. Kurtosis is a parameter that measures the "tailedness" of a Gaussian distribution, where tailedness is a measure of the amount of data in the tails or extremes of a Gaussian distribution compared to the central portion around the mean m. Kurtosis can be measured by determining the fourth standardized moment $\bar{\mu}_4$ about the mean m according to the equation:

$$\bar{\mu}_4 = E\left[\left(\frac{G-m}{\sigma}\right)^4\right] \quad (3)$$

Where E is the expectation operator, G is the Gaussian distribution, m is the mean and σ is the standard deviation as above. Gaussian parameters including skewness $\bar{\mu}_3$ and kurtosis $\bar{\mu}_4$ in addition to mean m, standard deviation σ and height a can be determined and used to characterize Gaussian curves.

Examination of Gaussian curves corresponding to the distributions of pixel counts 202, 206 corresponding to a live human face (pixel count 202) and a picture of the same human face (pixel counts 206) yields a quantifiable distinction between the standard deviations of the distributions. The distribution of pixel counts 206 corresponding to the picture of the human face in this example has a standard deviation that is greater than twice the standard deviation of the distribution of pixel counts 202 corresponding to the live human face. In histogram 208 the intensity of light illuminating a picture of a human face has been reduced to reduce the standard deviation of the distribution of pixel counts 210 to be similar to the standard deviation of the distribution of pixel counts 202 occurring in the histogram 200 corresponding to the live human face. Reducing the illumination in this fashion causes the mean of the distribution of pixel counts 210 corresponding to the dimmed picture of the human face to have a mean that is about half of the mean of the distribution of pixel counts 202 corresponding to the live human face.

Gaussian parameters m, σ, a, $\bar{\mu}_3$ and $\bar{\mu}_4$ for a live human face can be determined by first acquiring a sample image of the live human face by illuminating the live human face with NIR light and acquiring an RGB-NIR image. A histogram can be formed from the NIR pixels of the RGB-NIR image and values of Gaussian parameters can be determined based on the acquired histogram. Forming a histogram from pixels in an image is referred to as enrollment, and determining the values of Gaussian parameters is referred to as training a model. At a later time, when a human seeks access to the vehicle or device, a challenge image is acquired by illuminating the human with an NIR light and an NIR histogram is formed. Values of Gaussian parameters are determined by a computing device and compared to the trained model. If the values of the Gaussian parameters obtained from the challenge image are within a tolerance value of the values in the trained model, the challenge image is accepted, and the acquired image is transmitted to a computing device for further processing. Further processing can include facial recognition, for example. Tolerance values can be determined by empirical studies of histograms acquired from a plurality of live human faces and pictures of human faces. For example, values of m, σ, and a can be required to be within 50% of the values of m, σ, and a in the trained model for acceptance.

Another technique for authentication of human faces is texture processing on the acquired NIR image. Texture is a measure of the variation in pixel values of small regions of an image. Texture processing can distinguish between portions of an acquired NIR image of a human face and acquired NIR images of a photograph or mask. The variation in pixel values caused by variation in the 3D structure of small regions of a human face yield far different texture measures than the smoother variation of corresponding regions of a photograph or a photographically produced mask. Examples of texture processing techniques include Gabor filters and local binary patterns. Gabor filters are 2D convolution kernels formed by multiplying 2D Gaussian functions with sinusoidal functions. Local binary patterns compare the pixel values of eight nearest neighbors with the pixel value of the central pixel and populate a binary word with 1s or 0s depending upon whether the neighboring pixel is greater than the central pixel. Both of these texture processing techniques can yield an output image that can be further processed to distinguish between a human face and a photographic simulation. The output of a texture processing process can also be processed using Gaussian parameters as discussed above.

A spectroscopic material identification system as described herein can acquire NIR image data and train models for materials including cotton, polyester blends, latex, nylon and papers in addition to live human skin. Acquiring trained models for these types of materials can assist a live human recognition system in separating live human skin from materials that can be used to prepare masks that can be used to spoof facial recognition systems. For example, a photograph of a person can be printed on fabric which can be worn as a mask that conforms to a person's facial features. The combination of a high-resolution printed image of a human face with 3D facial contours can spoof a facial recognition system that relies on a 3D sensor to detect differences between a flat photograph and a human face. Techniques described herein improve the ability to distinguish between live human skin and a photographic likeness by acquiring data regarding the spectral response of human skin versus other materials. Likewise, techniques described herein improve the ability to distinguish between live human skin and silicon-based masks that can spoof systems that rely on 3D sensors to distinguish between 2D representations and live human faces.

Techniques described herein can also distinguish between live human faces and photographic likenesses despite objects such as facial piercings, eyeglasses, or temporary tattoos with metallic based ink. Objects like facial piercings, eyeglasses, or some tattoos can have different spectral reflectance compared to face or materials of interest like leather or nylon. For example, eyeglasses can reflect infrared light differently depending on the presence of polarization layers in the glass. The presence of anomalies such as piercings and eyeglasses can be detected by using techniques described herein. Information regarding the anomalies' size and shape can be extracted by processing RGB and NIR images of the subject using machine vision techniques. A library of machine vision techniques for object recognition is included in Dlib, a toolkit containing machine learning algorithms and tools for creating complex software in C++. Dlib is available at Github.com and is available on an open source license which permits its use free of charge. The location, size and shape of the anomalies can be subtracted from the image data prior to determining the histogram. Information regarding the anomalies can be added to a trained model database during enrollment and be used as additional data for identification and spoof rejection. Determining anomalies in NIR images is discussed in relation to FIGS. 7-11, below.

Performing robust materials spectroscopy as discussed herein can require creating a database of sufficient size to hold all or at least a meaningful set of expected materials and fakes. A large database of materials may result in large search times, which can be undesirable for a system designed to run in real time such as a facial recognition system. Run time optimization may be performed by placing bounds on the materials search space. Run time optimization can be performed based on the calculated material reflectance, where, for example, the calculated material reflectance would only be compared to the nearest material neighbors. Run time optimization can also be performed based on context. Context can include expected type of materials and their associated frequency based off historical use, location and type of activity; the materials would then be considered in order of likelihood.

Figure 3:
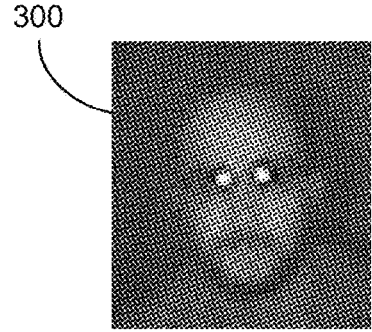
FIG. 3 is a diagram of example near infrared images and histograms.
Figure 3:
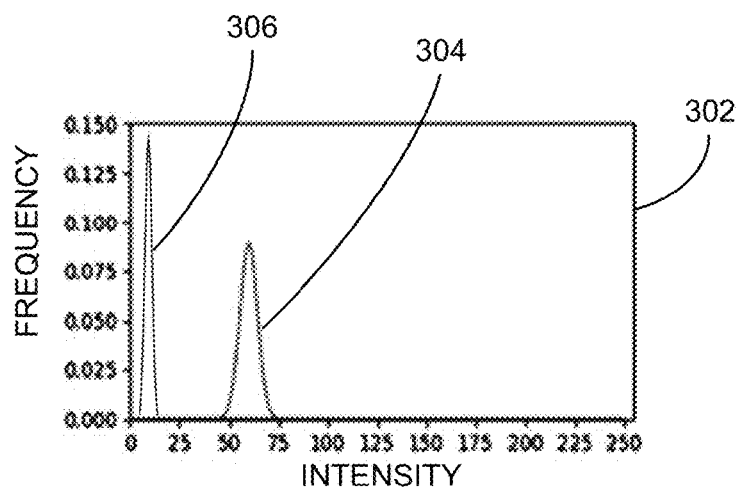
Figure 3:
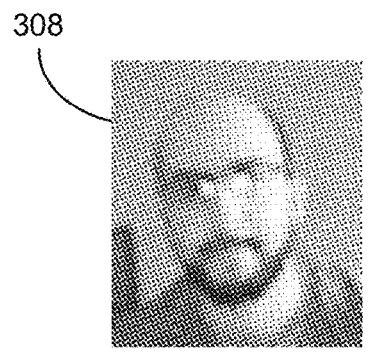
Figure 3:
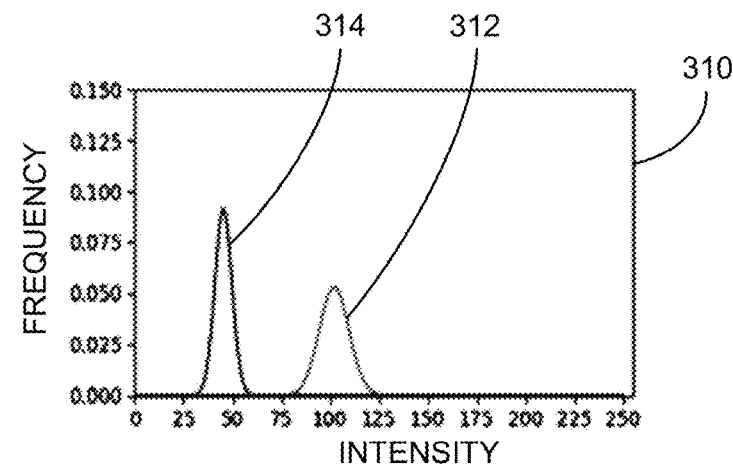

FIG. 3 is a diagram of two NIR images 300, 308 and two NIR histograms 302, 310 generated from the images 300, 308, respectively. The first NIR image 300 is acquired with low ambient light and the second NIR image 308 is acquired with average ambient light. Ambient light is defined as illumination in a scene that comes from light sources other than the NIR light. For example, room lights, vehicle interior lights or sunlight can be sources of ambient light. Different sources of ambient light can include different amounts of NIR illumination. For example, natural sunlight and incandescent light include substantial amounts of NIR illumination while fluorescent and LED light include almost no NIR illumination. Changes in ambient light can cause changes in a histogram generated from an NIR image acquired with the ambient light. This is illustrated by histograms 302, 310.

Histograms 302, 310 include Gaussian distributions 304, 306, 312, 314 that were determined by fitting Gaussian distributions to the raw data and rendered in the histograms in place of the raw data. In histograms 302, 310 the frequency scale (FREQUENCY) on the Y-axes corresponds to relative values of the a parameter for each Gaussian distribution 304, 306, 312, 314 rather than raw count data. In histogram 302 Gaussian distribution 304 corresponds to NIR pixel data for the human face in the NIR image 300 and Gaussian distribution 306 corresponds to NIR pixel data for the background ambient light. In histogram 310, Gaussian distribution 312 corresponds to NIR pixel data for the human face in the NIR image 308 and Gaussian distribution 314 place of the raw data. In histograms 302, 310 the count scale on the Y-axes corresponds to relative values of the a parameter for each Gaussian distribution 304, 306, 312, 314 rather than raw count data (as is displayed in the histograms 200, 204, 208 discussed above). In histogram 302 Gaussian distribution 304 corresponds to NIR pixel data for the human face in the NIR image 300 and Gaussian distribution 306 corresponds to NIR pixel data for the background ambient light. In histogram 310, Gaussian distribution 312 corresponds to NIR pixel data for the human face in the NIR image 308 and Gaussian distribution 314 corresponds to NIR pixel data for the background ambient light. As can be seen from histograms 302, 310, changes in ambient light in NIR images 300, 308 have changed the values of Gaussian parameters m, σ, a, $\bar{\mu}_3$ and $\bar{\mu}_4$ from histogram 302 to different values of Gaussian parameters m, σ, a, $\bar{\mu}_3$ and $\bar{\mu}_4$ in histogram 310. For example, the value of m in histogram 302 has changed from about 62 to about 100 in histogram 310, the value of σ has changed from about 12 in histogram 302 to about 25 in histogram 310 and the value of a has changed from about 0.08 in histogram 302 to about 0.06 in histogram 310.

Techniques discussed herein can compensate for ambient NIR illumination by fitting a Gaussian distribution to raw data corresponding to ambient NIR illumination. The shifts in Gaussian distributions are illustrated in histograms 302, 310 by Gaussian distributions 306, 314. The shifts in values of Gaussian parameters m, σ, a, $\bar{\mu}_3$ and $\bar{\mu}_4$ for Gaussian distributions for NIR pixel data for human faces based on values of Gaussian parameters m, σ, a, $\bar{\mu}_3$ and $\bar{\mu}_4$ for ambient NIR illumination can be determined empirically. A plurality of NIR images of human faces can be acquired in a plurality of ambient NIR conditions ranging from no NIR ambient illumination to high NIR ambient illumination. The relationships between shifts in Gaussian parameters m, σ, a, $\bar{\mu}_3$ and $\bar{\mu}_4$ for Gaussian distributions for NIR pixel data for human faces based on values of Gaussian parameters m, σ, a, $\bar{\mu}_3$ and $\bar{\mu}_4$ for ambient NIR illumination can be determined by linear regression between each variable separately. Linear regression can determine a linear relationship between the shift in values of Gaussian parameters m, σ, a, $\bar{\mu}_3$ and $\bar{\mu}_4$ for Gaussian distributions for NIR pixel data for human faces and measured values of Gaussian parameters m, σ, a, $\bar{\mu}_3$ and $\bar{\mu}_4$ for ambient NIR illumination. These linear relationships can be used to compensate for ambient NIR illumination.

In examples where determining a Gaussian distribution for ambient illumination is made difficult by greater variance in background illumination, ambient NIR illumination can be estimated by toggling the NIR illumination used to acquire the NIR image on to acquire a first NIR image, and then off to acquire a second NIR image. The second NIR image will thus include only ambient NIR illumination and can therefore be more readily analyzed using the methods discussed above to determine the effect of ambient NIR illumination. Values of Gaussian parameters m, σ, a, $\bar{\mu}_3$ and $\bar{\mu}_4$ for Gaussian distributions for ambient NIR illumination can be determined using this method and applied to the values of Gaussian parameters m, σ, a, $\bar{\mu}_3$ and $\bar{\mu}_4$ for Gaussian distributions for NIR pixels corresponding to the human face using the linear relationships determined above. This technique would require control of and synchronization with the NIR illuminator and would require acquisition of two frames of NIR image data, thereby increasing system cost and processing time. In authentication systems that use RGB data in addition to NIR data, the RGB image data can be used to determine ambient illumination in similar fashion to the techniques discussed for NIR images. Toggling a single RGB/NIR image will provide data that can be used to determine Gaussian parameters for red, green, and blue channels in addition to NIR channels.

Figure 4:
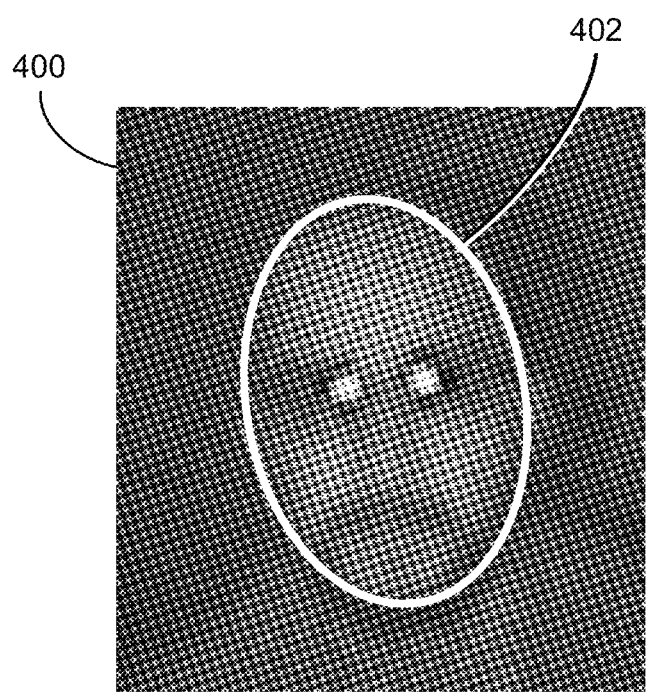
FIG. 4 is a diagram of an example near infrared image with a human face detected.

FIG. 4 is a diagram of an NIR image 400 that illustrates a second technique for estimating ambient NIR illumination. In NIR image 400 the portion of the NIR image 400 occupied by the human face indicated by an ellipse 402. This ellipse 402 can be generated by processing the NIR image 400 with facial recognition software available in Dlib, for example, as discussed above in relation to FIG. 2. Facial recognition software can determine an ellipse 402 that encloses the portion of NIR image 400 occupied with a human face. A histogram can be formed using pixels within the ellipse 402 to determine values of Gaussian parameters m, σ, a, $\bar{\mu}_3$ and $\bar{\mu}_4$ for Gaussian distributions for NIR pixel data for the human face within the ellipse 402 and a histogram for pixels outside the ellipse 402 can be used to determine values of Gaussian parameters m, σ, a, $\bar{\mu}_3$ and $\bar{\mu}_4$ for Gaussian distributions for NIR pixel data corresponding to ambient NIR illumination. Once the values of Gaussian parameters m, σ, a, $\bar{\mu}_3$ and $\bar{\mu}_4$ for both Gaussian distributions are determined, then the values of Gaussian parameters m, σ, a, $\bar{\mu}_3$ and $\bar{\mu}_4$ for Gaussian distributions corresponding to the human face can be adjusted using the linear relationships determined above. In examples where the image data includes more than one human face, each human face can be detected, and an ellipse can be generated for each face. The average light intensity can be determined for each face and Gaussian parameters for pixels corresponding to each face can be determined. Determining background Gaussian parameters for background pixels can be more accurately determined based on comparing the background to Gaussian parameters for each face in the field of view of the camera.

Calculation of background pixel intensities can be initiated in an authentication system based on determining an overall average pixel intensity for an acquired NIR or RGB/NIR image and comparing it to a previously acquired value. If the average pixel intensity of the acquired image differs by more than a user determined threshold value from a previously acquired image, the system can re-calculate the background value based on the currently acquired image. In other examples, the variance of the pixel values can be determined for a currently acquired image and compared to a variance determined based on a previously acquired image. If the variance of pixel values in the current image differs by more than a user-determined threshold amount from a previously determined variance value, new background pixel parameters can be determined as described above. In yet other examples, an elapsed time clock can be started when background pixel values are determined and the background pixel values can be re-determined when a user-determined time period, for example 10 seconds has elapsed since the last background was determined.

Another technique for determining Gaussian parameters for pixels outside of the ellipse 402 is to divide portions of the NIR image 400 outside of the ellipse 402 into segments with uniform size and shape. Background portions of NIR image 400 are the portions of NIR image 400 outside of ellipse 402. Background portions of NIR image 400 can include objects that reflect NIR illumination and interfere with calculation of Gaussian parameters that correspond to background illumination. For example, a hat, a scarf, or a subject's hand can be included in the background portions of NIR image 400. The background portion of NIR image 400 can be divided into segments with uniform size and shape by combining a user-determined pattern of regions with the ellipse 402 corresponding to a subject's face. The background segments can be contiguous or non-contiguous. A Gaussian parameters of pixel values can be determined for each segment. An overall mean and standard deviation for pixel values can be determined, i.e., for all segments, and segments with a standard deviation that is less than or equal to the overall standard deviation can be retained for generation of a histogram and determination of Gaussian parameters m, σ, a, $\bar{\mu}_3$ and $\bar{\mu}_4$ to correspond to the background illumination. Regions with standard deviations greater than the overall standard deviation are eliminated from the background histogram generation. The overall standard deviation can include a user-determined tolerance value based on the amount of noise in the pixel values. Determining the background histogram in this fashion reduces the effect of objects in the background portion of NIR image 400 from being included in the Gaussian parameter determination for background portions of NIR image 400.

Another technique for determining ambient NIR illumination is based on combining data from the NIR channel with data from one or more of the RGB channels. The Gaussian distributions corresponding to a human face in a histogram can be normalized based on data from the blue channel, for example. Normalization can be performed by dividing the value in each NIR pixel by corresponding pixel values in the blue channel. Dividing by the value of pixels in the blue channel normalizes the NIR data because the data in the blue channel corresponds to ambient illumination without NIR illumination. Dividing the NIR pixel values by corresponding pixel values from the blue channel can approximate the effect of toggling the NIR light off to acquire an ambient illumination image without requiring the time and expense of controlling the NIR light.

Another technique for combining NIR and RGB data is channel fusion. Channel fusion is when data from two or more channels are combined to form a multidimensional space. For example, data from the NIR channel and data from the blue channel can be combined using orthogonal axes corresponding to the NIR data and the blue channel data that form a two-dimensional space. Each pixel will be located in the two-dimensional space according to its NIR channel and blue channel values and the resulting graph will indicate the pixel count corresponding to the NIR channel and blue channel values. Two-dimensional Gaussian curve fitting can be performed on the two-dimensional space that includes the two-dimensional count data to determine two-dimensional Gaussian parameters that can be processed in similar fashion to one-dimensional Gaussian parameters. Additional channel data can be combined by adding an additional orthogonal axis for each channel added thereby forming higher dimensional spaces. Higher dimensional Gaussian parameters can be determined for the higher dimensional spaces and processed in similar fashion to one-dimensional Gaussian parameters as discussed below in relation to FIG. 5.

Figure 5:
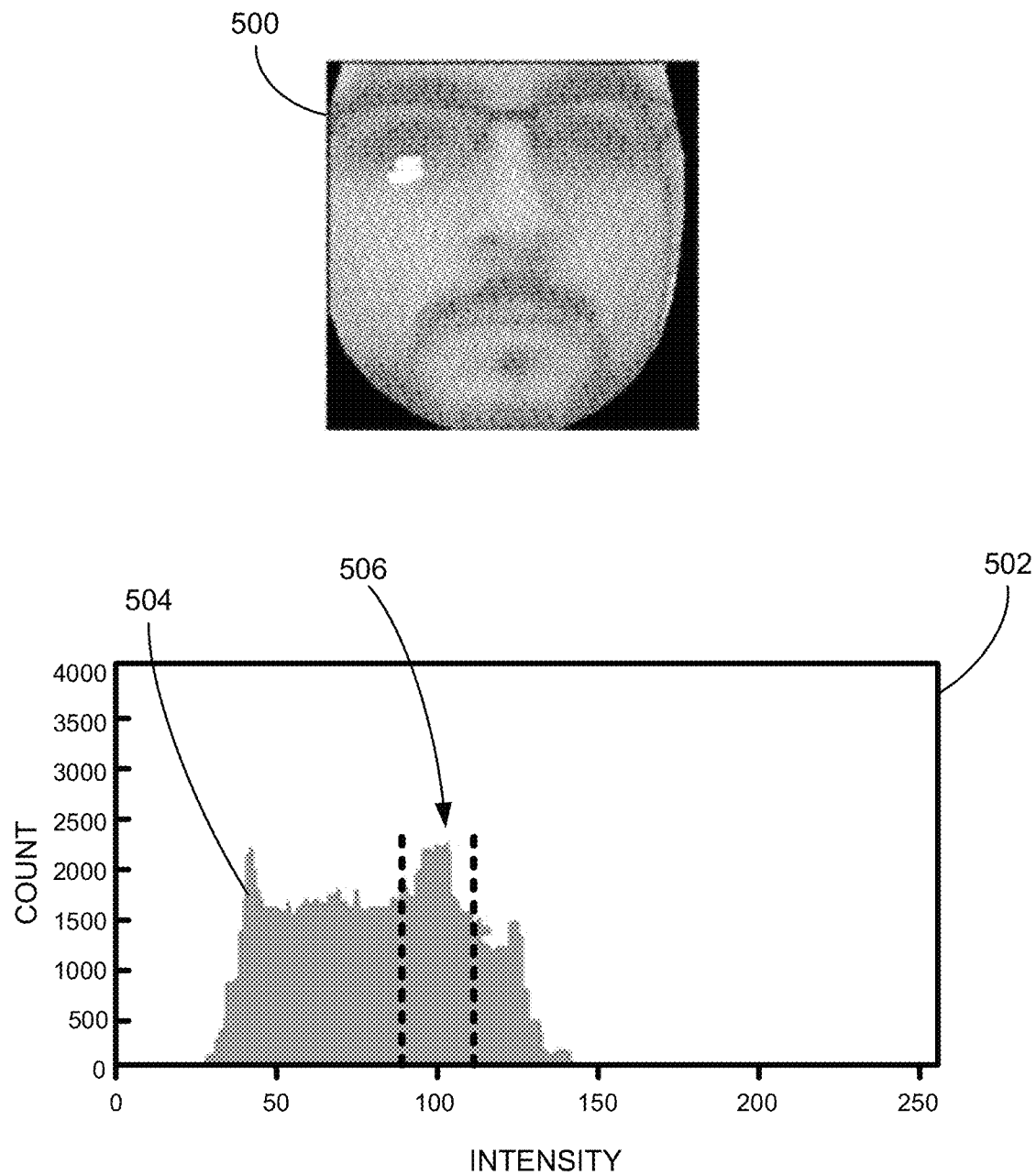
FIG. 5 is a diagram of an example near infrared image with an isolated human face and a histogram.

FIG. 5. is a diagram of an NIR image 500 of a human face illuminated by NIR light and a histogram 502 corresponding to the NIR pixels of the NIR image 500. The histogram 502 includes count data 504 corresponding to the frequency or count data plotted on a graph with the Y-axis corresponding to the number of pixels at each pixel value (represented by the axis labeled COUNT) and the X-axis (labeled INTENSITY) corresponding to the range of pixel values, i.e., intensities, in the NIR image 500. The dotted lines 506 enclose or bound pixel values that correspond to intensity values for human skin occurring in NIR image 500. The remainder of the count data 504 corresponds to non-skin portions of the human face in NIR image 500, for example facial hair including beard and eyebrows, lips, eyes and eyeglasses.

Each portion of the human face included in NIR image 500 corresponds to a Gaussian distribution of pixel values. In histogram 502 a plurality of Gaussian distributions corresponding to a plurality of portions of NIR image 500 are added together to form the count data 504. An issue with processing count data 504 to determine Gaussian distributions for a plurality of portions of an NIR image 500 is determining separate the Gaussian distributions for each of the portions. One technique of separating the Gaussian distributions is to assume a Gaussian mixture model for the count data 504. A Gaussian mixture is a probabilistic model for representing subpopulations within an overall population. In this example, count data 504 is modeled as a mixture of a plurality of components, where each component is a Gaussian distribution.

The Gaussian mixture corresponding to the count data 504 can be a probability distribution $p_n(x)$ for the $n^{th}$ iteration which is equal to a function of K Gaussian distributions (components) determined by the equation:

$$p_n(x) = \Sigma_{i=1}^{K} \bar{\phi}_i \, \mathcal{N}\, (\bar{\mu}_i, \Sigma_i) \qquad (4)$$

Where $\bar{\phi}_i$ is an estimate of the mixture weight, which is the prior probability corresponding to a component i and $\mathcal{N}$ is a Gaussian (normal) distribution function for each component described by an estimated mean $\bar{\mu}_i$ and an estimated covariance matrix $\Sigma_i$ that describes the distribution of each component in the presence of each other component.

One technique for determining the distributions of each component of a Gaussian mixture is Expectation Maximization (EM). Given an initial estimate of i, the number of components, the EM algorithm iterates on equation (2), adjusting component weights $\bar{\phi}_i$, calculating a new distribution $p_n(x)$ at each step and determining a conditional probability for the new distribution based on the values of Gaussian parameters m, σ, a, $\bar{\mu}_3$ and $\bar{\mu}_4$ determined for each of the Gaussian distributions in the population. Each iteration of the EM algorithm updates the values of m, σ, a, $\bar{\mu}_3$ and $\bar{\mu}_4$ and the mixture weights $\bar{\phi}_i$ to increase the conditional probability that the calculated distribution $p_n(x)$ is equal to the input distribution p(x). Iterating using the EM technique will converge on a solution corresponding to a summed square difference less than a threshold in a finite number of steps. Problems with convergence to local maxima and sensitivity to the starting point can be addressed by determining a sample grid based on the probable solution space and an appropriate threshold can be determined based on empirical testing. Using a Gaussian mixture model is one technique to isolate pixel data of interest to perform authentication using material spectroscopy as described herein. Other techniques include other types of filters applied to both the histogram data and input image data, higher order statistical processing applied to the histogram data or deep neural network processing as will be described below in relation to FIG. 7.

Figure 6:
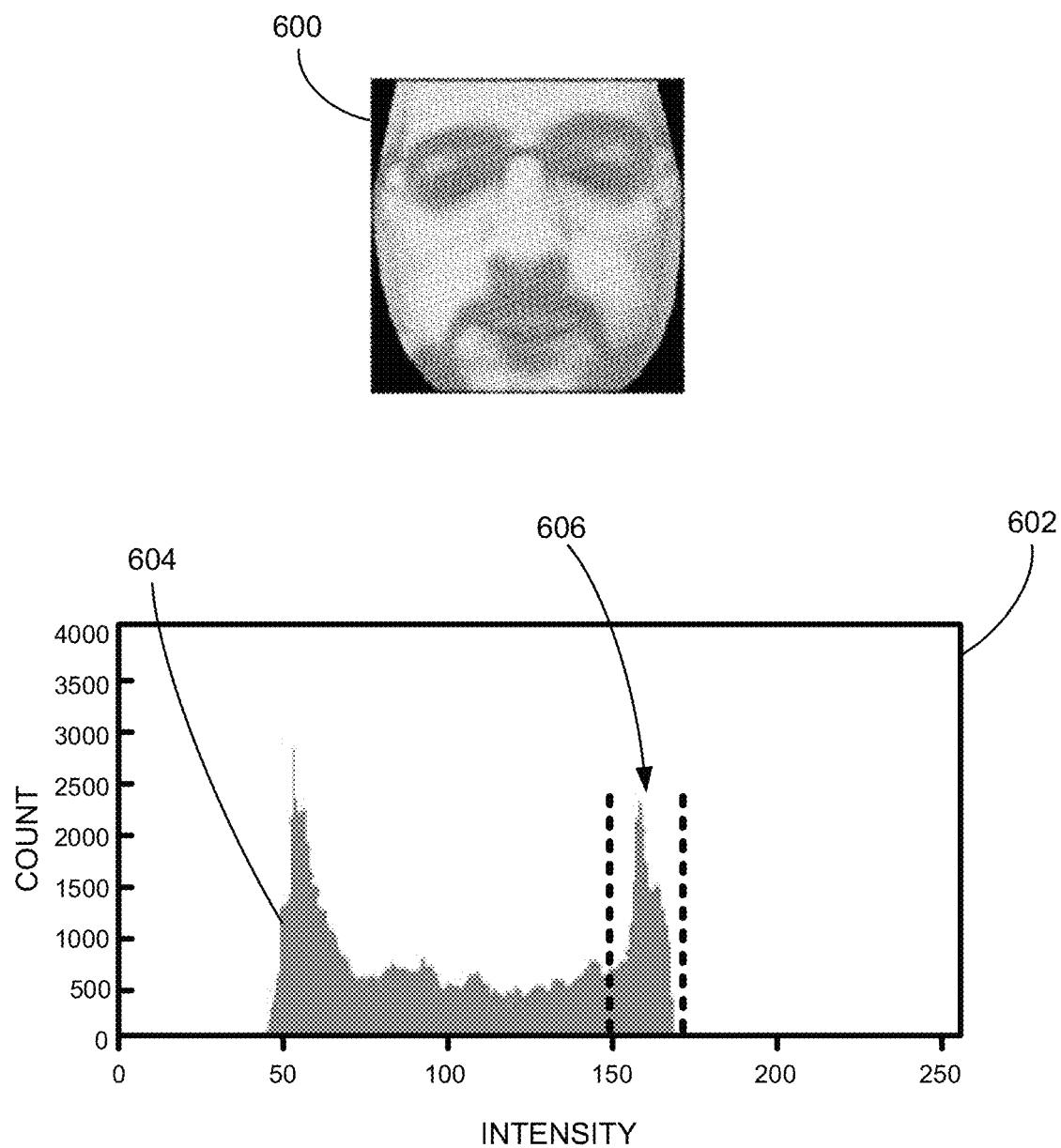
FIG. 6 is a diagram of an example near infrared image of a fake human face and a histogram.

FIG. 6 is a diagram of an NIR image 600 of a picture of a human face and a histogram 602 formed by count data 604 representing pixels of the NIR image 600. The histogram 602 includes count data 604 corresponding to the frequency or count data plotted on a graph with the Y-axis corresponding to the number of pixels at each pixel value (COUNT) and the X-axis corresponding to the range of pixel values (INTENSITY) in the NIR image 600. The dotted lines 606 enclose (i.e., bound) the pixel values that correspond to intensity values for "skin" occurring in NIR image 600. The remainder of the count data 604 corresponds to non-"skin" portions of the picture of the human face in NIR image 600, for example representations of facial hair, eyes, and eyeglasses. The distribution of count data 604 for the picture of the human face differs from the distribution of count data 504 from the live human face. Separating the distributions corresponding to the real human skin and the photographic representation of human skin from the count data 504, 604 using the EM algorithm based on a Gaussian mixture model can distinguish between an image of a real human and an image of a photograph of a human by extracting Gaussian distributions that can be analyzed by the techniques described above in relation to FIGS. 2-4, above.

Figure 7:
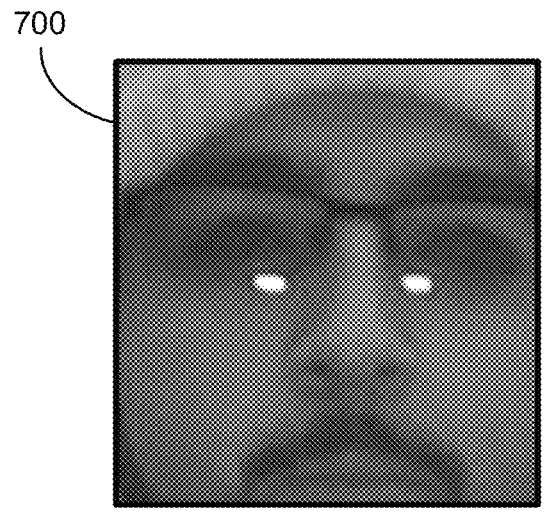
FIG. 7 is a diagram of an example near infrared image of a human face and an image of a segmented human face.
Figure 7:
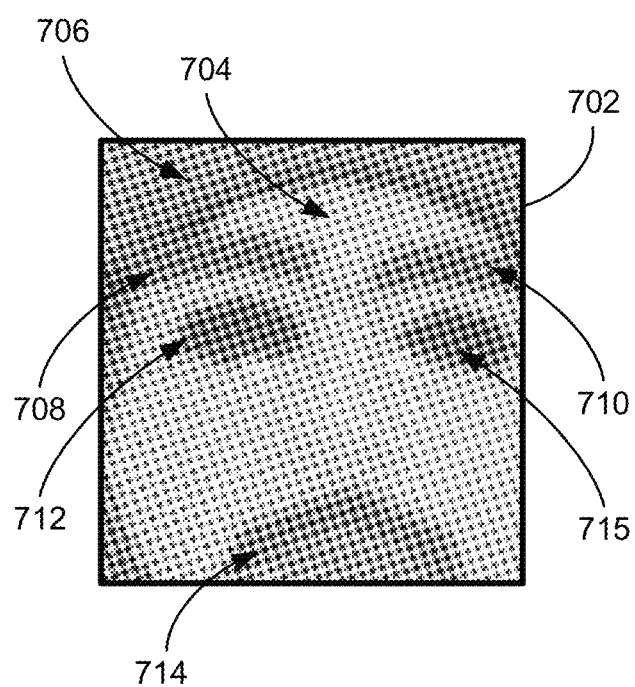

FIG. 7 is a diagram of an NIR image 700 and a segmented NIR image 702 that illustrates another technique for separating Gaussian distributions belonging to separate components or potions of an NIR image 700. In this example, the NIR image 700 is segmented prior to forming histograms and separate histograms are generated corresponding to each portion or component of the NIR image 700. The image of the human face in NIR image 700 can be processed using a trained deep neural network to generate a segmented image 702 or by using the Dlib image processing library as discussed above in relation to FIG. 2 to determine facial landmarks which can be processed to form segmented image 702. For example, an input NIR image 700 can be processed using the Dlib image processing library to generate facial landmarks. Facial landmarks are locations on an image of a human face that can be repeatably determined on images of human faces, where repeatably determined means that the same landmarks will be determined on a plurality of different input images. For example, the Dlib image processing library can locate facial landmarks corresponding to the inside and outside corners of each eye visible in an image of a human face, along with facial landmarks corresponding to the upper and lower lids of each eye. Fitting an ellipse to the facial landmarks corresponding to each eye will provide an area that segments the eye portions of an image of a human face. Likewise, facial landmarks corresponding to other portions of a human face such as libs and facial hair can be joined by lines that generate regions that can be used to segment an NIR image 700 of a human face to generate a segmented image 702.

Another technique for processing an input NIR image 700 to determine image segments corresponding to human skin, eyes, facial hair, etc. is to train a deep neural network to process NIR images 700 that include human faces. A deep neural network can include convolutional layers and fully-connected layers that process input NIR images 700 and output an image with labeled regions corresponding to portions of a human face and background portions as illustrated in segmented image 702. A convolutional neural network can be trained by generating a training dataset by labeling a large number (>1000) of NIR images 700 of human faces to form ground truth images for training the convolutional neural network. An NIR image 700 can be manually labeled by a human operator using graphics software that permits the human operator to overlay labeled regions on an NIR image 700 of a human face. Labeled NIR images 702 can also be generated by inputting the NIR images 700 into the Dlib software as discussed above to generate facial landmarks which can be processed either manually or using machine vision software to generate regions corresponding to facial features to be segmented as discussed above. In either case, at training time, NIR images 700 are input to the convolutional neural network and a loss function is determined based on comparing the output from the convolutional neural network to the ground truth segmented NIR images 702 and the resulting loss value is used to select weights for the convolutional neural network to minimize the loss function. In operation a NIR image 700 that includes a human face in input to the trained convolutional neural network and a segmented NIR image 702 that includes labels is output.

A segmented image 702 generated by machine vision software or by a deep neural network assigns color or greyscale values based on a small number (<10) of possible different types of facial features. The facial features include skin 704, background (non-facial) 706, eyebrows 708, 710, eyes 712, 716, facial hair (beard) 714 and lips 718. Other portions of the input NIR image 700, such as eyeglasses, can be ignored by the segmentation process as being non-essential and not likely to impact calculation of the histograms. Image segmentation is a "denoising" technique that provides histogram data corresponding to skin portions of a human face without including non-skin portions such as eyes or facial hair. Additional processing can be required to isolate skin portions from non-skin portions. Filters, higher order statistics or further processing with neural networks can further isolate pixels corresponding to human skin. For example, machine vision software or deep neural networks can also generate segmented NIR images that isolate the upper cheek and nose regions similar to mask portions 1008, 1108, 1208, 1308 of NIR images 1000, 1100, 1200, 1300, respectively. Using segmentation techniques to mask input NIR images in this fashion can reliably provide pixel data corresponding to skin portions of a human face because the upper cheek and nose regions of the human face are rarely obscured by facial hair or otherwise covered by clothing.

In addition to processing images of human faces, image segmentation can be used to segment images of consumer goods or industrial parts to locate regions that can be processed to determine genuine items from fake items. For example, an article can be processed to isolate a portion of the article corresponding to leather. Techniques described herein can be used to differentiate between genuine leather and imitation leather based on spectroscopic response as discussed above in relation to distinguishing skin from a photograph of skin. Segmentation techniques can also be evaluated based on the success or failure of the overall authentication process as discussed above in relation to FIG. 5. Segmentation images corresponding to true negatives (correctly identifying an attempt to spoof the system) and false negatives (denying access to a valid user) can be stored and used to retrain the system both locally on the computing device 115 in a vehicle 110 and uploaded to a cloud-based server computer to be used to retrain the authentication system to be shared with other vehicles in a federated system. As discussed above, in a federated system, each vehicle shares results that can be used to retrain the entire system which can then be shared with all of the vehicles.

In addition to segmenting NIR images, a deep neural network can be trained to process NIR images directly to determine whether the NIR image included a real human face or a fake human face. A deep neural network can be used to process NIR images directly, without extracting one to multi-dimensional Gaussian parameters from histogram data. A deep neural network includes a plurality of convolutional and fully-connected layers that process input data using weights to determine the processing performed at each layer. The weights for each layer can be determined by training the deep neural network using a large number, which can be greater than 1000, of training images. Each training NIR image includes ground truth corresponding to the NIR image, where ground truth is the "correct answer" corresponding to the image data determined by a means independent from the deep neural network. In this example, the correct answer can be determined by a human observing the image and labeling the image data as "human" or "fake", for example. The deep neural network processes each input image a plurality of times to attempt to classify the input image as "human" or "fake". Output from the deep neural network is compared to the ground truth to determine a loss function, which is backpropagated to the deep neural network to determine which weights achieve a correct answer, i.e. low loss value. The weights which achieve low loss for the most input images are retained and form the parameters used in the trained deep neural network. The trained deep neural network can then be used to process challenge images to determine whether the input image is "human" or "fake".

Figure 8:
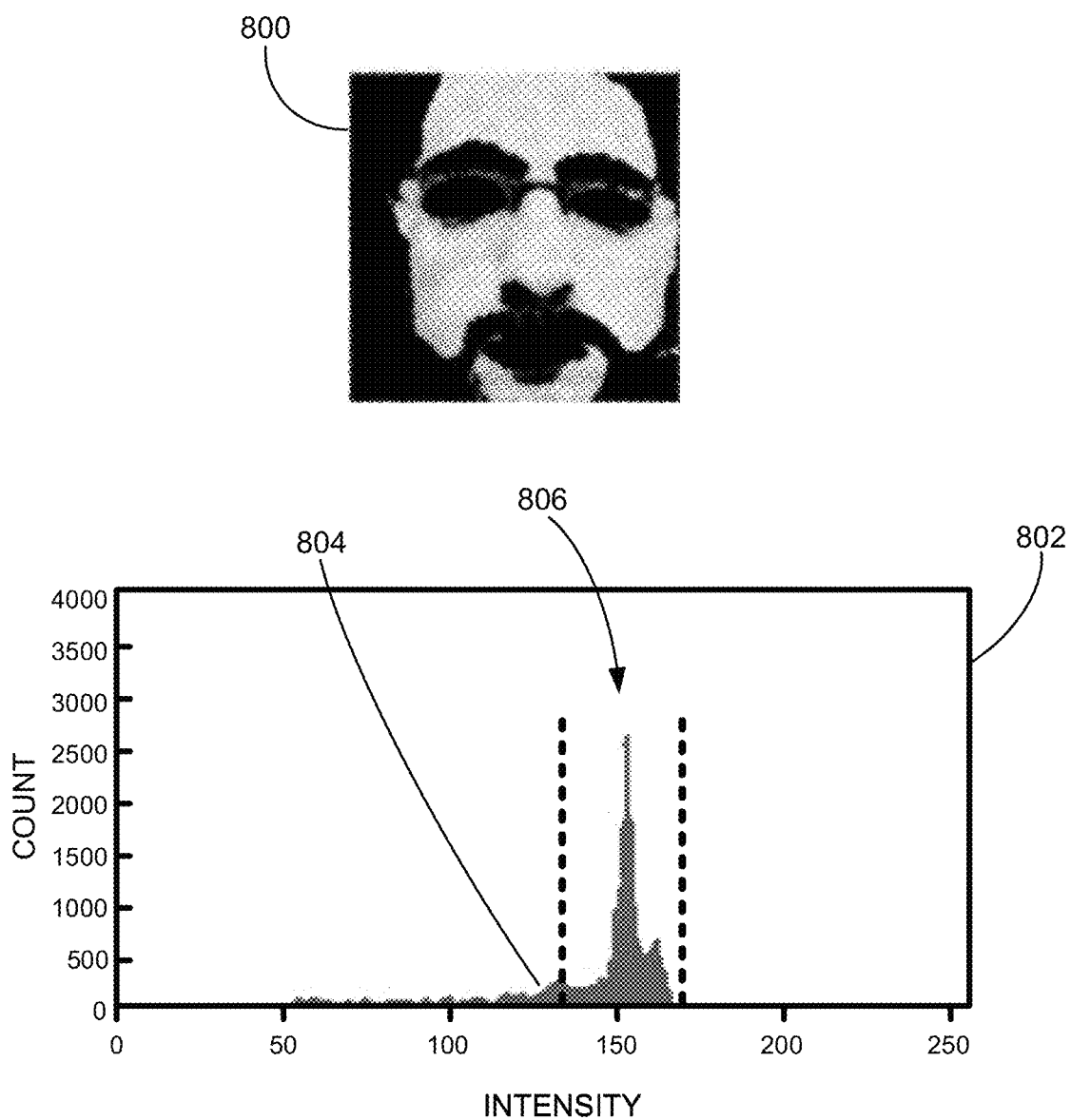
FIG. 8 is a diagram of an example near infrared image of a segmented human face and a histogram.

FIG. 8 is a diagram of a segmented NIR image 800 of a photograph of a human face and a histogram 802 determined based only on the "skin" portion of the segmented NIR image 800. Segmented NIR image 800 is based on NIR image 600 from FIG. 6 and is determined using a deep neural network or machine vision software as discussed above in relation to FIG. 7. Segments included in segmented image 800 can be used as a mask to guide generation of histogram 802 from the original NIR image 600 used to form the segmented NIR image 800. In histogram 802, only the pixels of the NIR image 600 used to form segmented NIR image 800 included in the "skin" portion of segmented NIR image 800 are used to calculate the count data 804. As can be seen from histogram 802 the count data 804 is concentrated in the "skin" 806 portion of histogram 802 enclosed by the dotted lines. Comparing histogram 802 to histogram 602 which was determined based on the same NIR image 600 without segmentation shows that histogram 802 includes far less data from non-skin portions of the NIR image 600. Use of a segmented NIR image 800 as a mask permits calculation of Gaussian parameters without requiring application of a Gaussian mixture model or improving the performance of a Gaussian mixture model applied to the count data 804 to extract the Gaussian distribution that includes only the skin portion of the NIR image 600.

Figure 9:
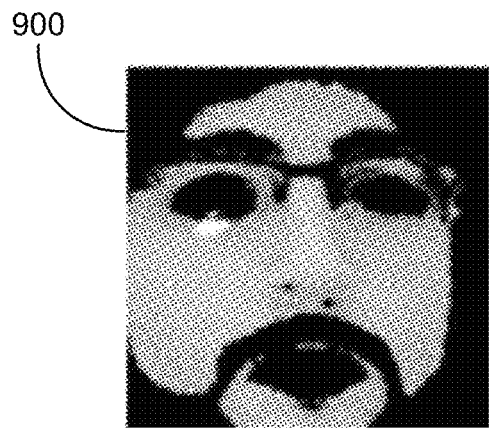
FIG. 9 is a diagram of an example near infrared image of a segmented fake human face and a histogram.
Figure 9:
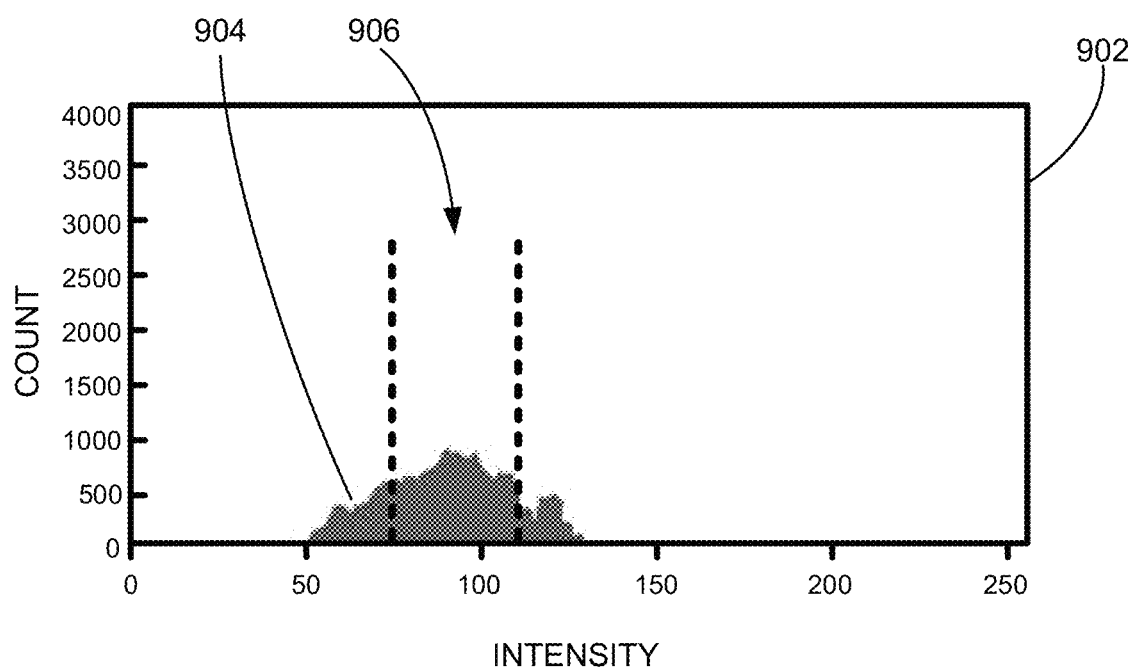

FIG. 9 is a diagram of a segmented NIR image 900 and a histogram 902 determined based on the "skin" portion of the segmented NIR image 900. Segmented NIR image 900 is based on the NIR image 700 of a human face and is determined using a deep neural network or machine vision software as discussed above in relation to FIG. 7. Segments included in segmented image 900 can be used as a mask to guide generation of histogram 902 from the original NIR image 700 used to form the segmented NIR image 900 similarly to FIG. 8. In histogram 902, only the pixels of the NIR image 700 used to form segmented NIR image 900 included in the "skin" portion of segmented NIR image 900 are used to calculate the count data 904. As can be seen from histogram 902 the count data 904 is concentrated in the "skin" 906 portion of histogram 902 denoted by the dotted lines. Comparing histogram 902 to histogram 802, it can be seen that calculation of Gaussian parameters for the two distributions can be used to distinguish the two distributions and thereby distinguish an NIR image 600 of a photograph from an NIR image 700 of a human face.

Figure 10:
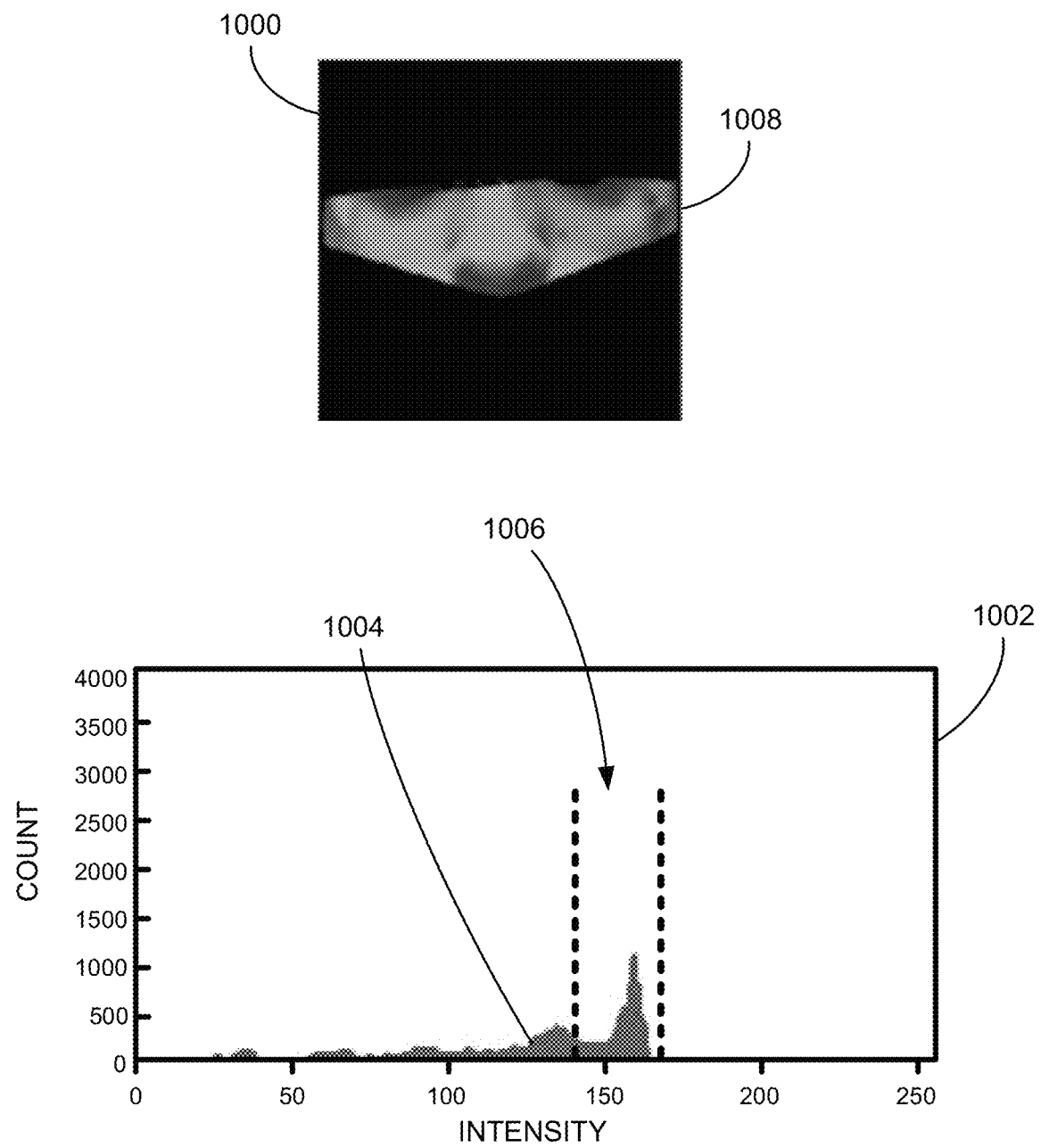
FIG. 10 is a diagram of an example masked near infrared image of a human face and a histogram.

FIG. 10 is a diagram of a NIR image 1000 of a photograph of a masked human face and a histogram 1002 determined based on the unmasked portion of the masked NIR image 1000. An unmasked portion 1008 of the masked NIR image 1000 is determined based on a previous NIR image of a human face acquired with the same camera by manually determining a mask that includes skin from the human face and masks off other types of data including facial hair, eyes, etc. Masking is a technique for determining a portion of an NIR image 1000 to be used to form a histogram 1002 that reduces the amount of non-skin data included in the count data 1004. Masking using a predetermined unmasked portion 1008 requires cooperation from the subject. For example, a human seeking approval from a liveness determination system as discussed herein would have to ensure that their face was positioned correctly with respect to the camera acquiring the NIR image. Positioned correctly means that the skin portion of the human's face must appear in the unmasked portion 1008 of the NIR image 1000.

The advantage of the masking technique for acquiring a histogram 1002 based on a masked NIR image 1000 of a picture of a human face is that most of the count data 1004 corresponding to the unmasked portion 1008 of the NIR image 1000 is concentrated in a portion 1006 of the histogram 1002 between the dotted lines. Concentrating the count data 1004 in this manner and eliminating extraneous data using a mask advantageously can reduce the amount of computation required to isolate count data 1004 corresponding to skin. This concentration of count data 1004 permits computation of the Gaussian parameters m, σ and a without having to first calculate Gaussian Mixture parameters or segmenting NIR facial images to separate skin histogram count data from other types of count data.

Figure 11:
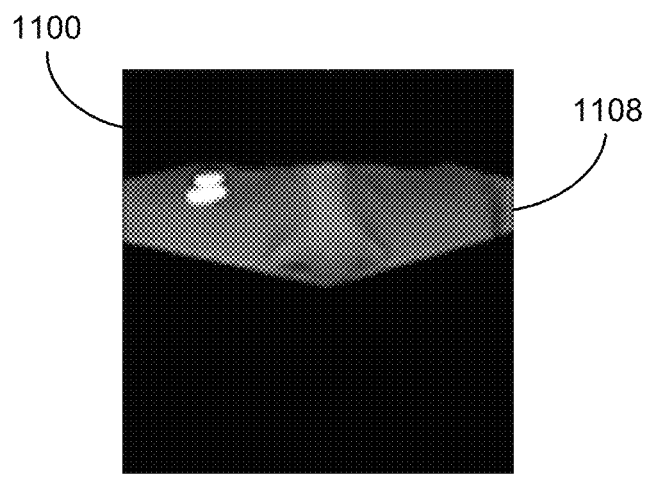
FIG. 11 is a diagram of an example masked near infrared image of a fake human face and a histogram.
Figure 11:
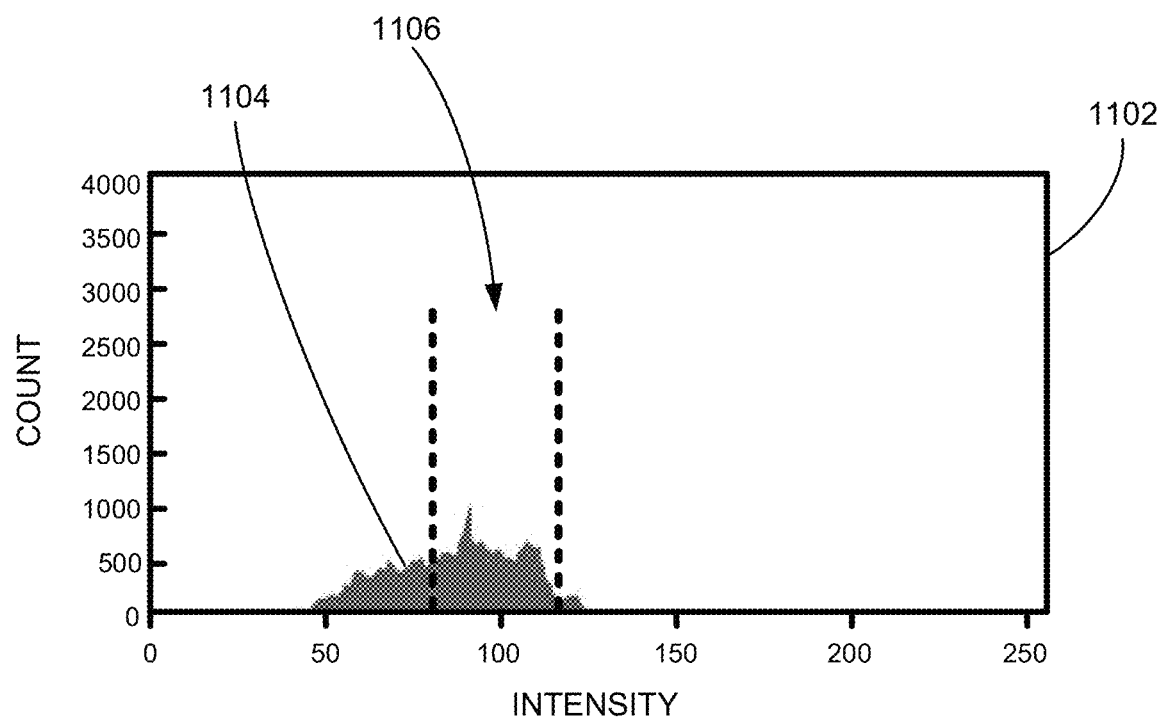

FIG. 11 is a diagram of a masked NIR image 1100 of a human face and a histogram 1102 corresponding to the unmasked portion 1108 of NIR image 1100. The unmasked portion 1108 of the masked NIR image 1100 is determined manually as discussed above in relation to FIG. 10. As can be seen in histogram 1102, masking concentrates count data 1104 corresponding to human skin into a portion 1106 of the histogram 1102 between the dotted lines. As in histogram 1002 of FIG. 10, concentrating count data 1104 advantageously permits determining the Gaussian parameters m, σ and a without requiring calculation of Gaussian Mixture parameters or segmenting NIR facial images to separate skin histogram count data from other types of count data. As can be seen from histograms 1002 and 1102, masked NIR images 1000, 1100 readily separate Gaussian distributions of count data 1004, 1104 corresponding to photographs of skin and human skin, thereby permitting a liveness determination system to differentiate between a photograph of human skin and live human skin. This permits a liveness determination system to forward an NIR image corresponding to the masked NIR image 1100 that includes a live human face to a facial recognition system and reject the NIR image of a photograph of a human face corresponding to a masked NIR image 1002 of a photograph of a human face.

In some examples, additional features included in a human face, such as tattoos and piercings may complicate calculation of Gaussian parameters for skin potions of a human face. In these examples, additional masks can be determined which cover additional portions of a human face to mask off portions that include non-skin or modified skin portions such as tattoos, piercings, etc. that can interfere with calculations of Gaussian parameters. Another technique for eliminating non-skin portions of an NIR image of a human face recognizes that piercings, for example, are highly reflective of NIR light and therefore appear bright in an NIR image. A filter applied to the NIR image that filters out bright regions of the NIR image can be used to eliminate non-skin regions of a human face corresponding to jewelry including piercings.

Another technique for masking an NIR image of a human face is to generate uniform random patches or regions on portions of the NIR image that include a human face. A set of similarly-sized random patches can be compared to a segmented image 702 of the human face such as shown in FIG. 7 to generate a score for each patch that corresponds to the percentage of human skin included in the patch. Patches can be scored as low, meaning no skin pixels are included in the patch, medium, meaning some skin pixels are included in the patch, or high, meaning that most of the pixels in the patch are skin pixels. Medium patches can be further subdivided into sub-patches and compared to the segmented image 702 to determine high subdivided patches that include mostly skin pixels and low subdivided patches that do not include mostly skin. The patches rated high and the subdivided patches rated high can be combined and a histogram can be generated based on the high patches and high subdivided patches. Using random patches in this fashion can speed the computation of Gaussian parameters corresponding to skin portions of an NIR image and thereby improve the determination of liveness for an NIR image of a human face.

Figure 12:
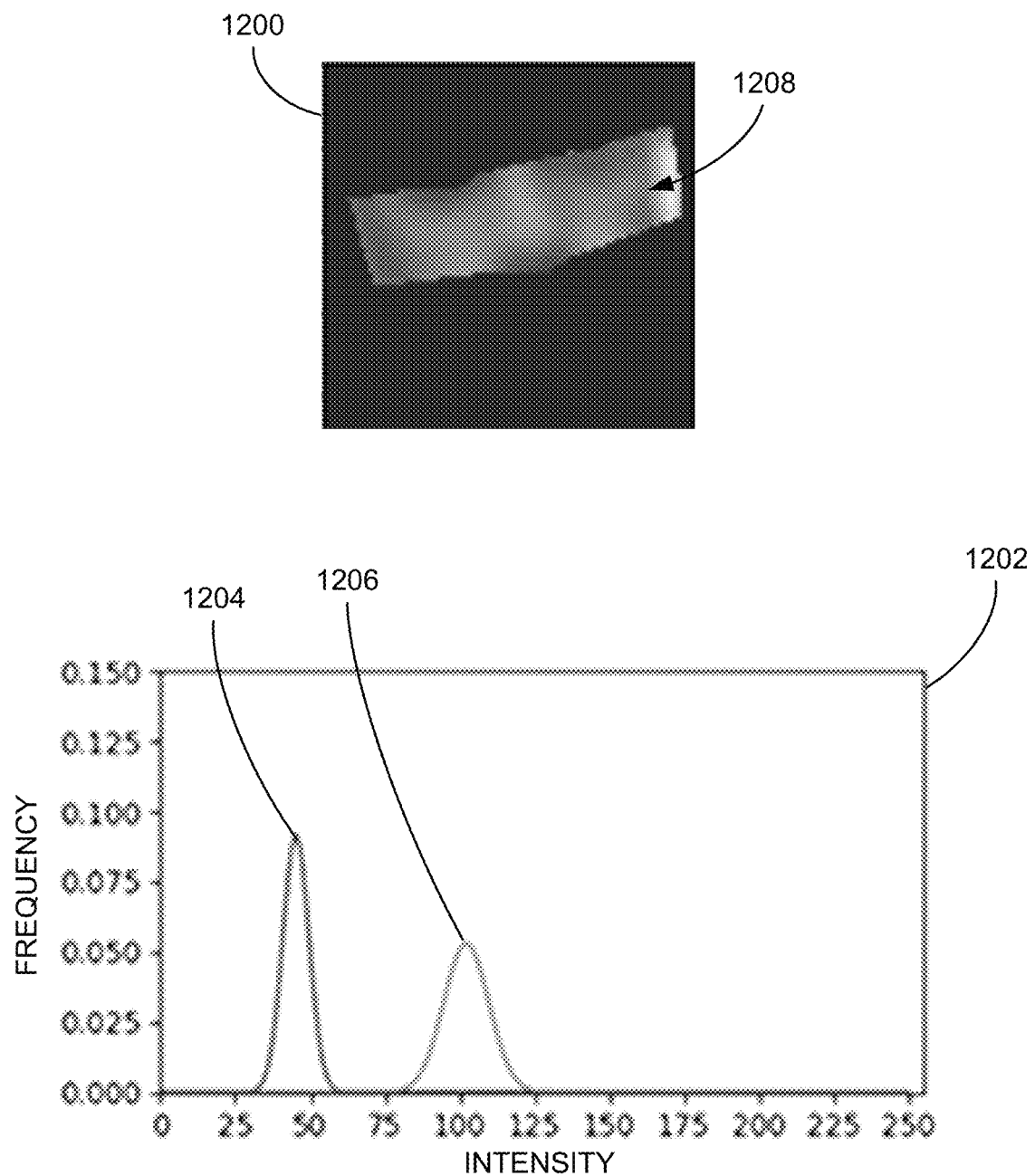
FIG. 12 is a diagram of an example masked near infrared image of a human face acquired at a first distance.

FIG. 12 is a diagram of a masked NIR image 1200 of a human face and a histogram 1202 corresponding to the unmasked portion 1208 of masked NIR image 1200. NIR image 1200 and histogram 1202 correspond to an NIR image acquired with the human face at about a 1 meter (m) distance. FIG. 12 illustrates a solution to the problem caused by differences in distributions of NIR pixel intensities in histogram 1202 caused by differences in distances from the camera of objects, in this example human faces. Techniques discussed herein employ light from a near-point source wide field NIR illuminator. Most NIR illuminators that are not laser-based or collimated with special optics are near-point source wide field NIR illuminators. For example, light emitting diode (LED) based NIR illuminators are typically configured to provide near-point source wide field NIR illumination. Light from a near-point source wide field NIR illuminator will spread out as it is transmitted from the source to the object to be illuminated. Because it is spreading out in two dimensions perpendicular to the direction of propagation, the intensity of the light will be subject to an inverse square law reduction in intensity per unit area. The inverse square law in this context means that the per unit area intensity of the NIR light will be subject to a reduction in intensity proportional to the inverse of the squared distance from the source.

When NIR illumination, subject to inverse square law reduction in intensity, illuminates an object, the light can be reflected by specular reflection or diffuse reflection. Specular reflection is reflection from a mirror or polished surface such a metal where the direction and polarization of each light ray reflected by the surface is preserved so that images, for example are preserved. Diffuse reflection is reflection from a surface wherein each light ray is absorbed by the surface and re-emitted in a random direction at a random polarization. In diffuse reflection each point on an illuminated surface in effect becomes a point source, wide field emitter of light. One difference between specular reflection and diffuse reflection is that in specular reflection, the reflected light continues to be governed by inverse square law reduction in intensity, while diffuse reflection subjects the reflected light to a second inverse square law reduction, making the net intensity of the light subject to an inverse quadratic law reduction in intensity as a function of the distance from the source, where the reduction in intensity of the light is reduced by the inverse fourth power of the distance from the emitter. As a result, the intensity of pixel data in an NIR image acquired with diffusely reflected NIR light will be subject to an inverse quadratic reduction in intensity and distributions of pixel intensities in histograms formed based on the pixel data will reflect this reduction in intensity based on distances to NIR illuminated objects.

In practice, objects, including human faces, will reflect NIR light in a combination of specular and diffuse reflections. For example, highlights or bright spots in NIR images caused by eyeglasses and metallic jewelry such as piercings are examples of specular reflections. Patches of shiny skin surfaces can also include a higher percentage of specular reflections, hence their apparent brightness in comparison to surrounding skin. Although human skin, for example, can reflect light subject to a combination of inverse square law reduction and inverse quadratic law reduction, in general the intensity of reflected light will decrease with increasing round-trip distance between the NIR illuminator and the NIR camera. Techniques discussed herein can improve liveness determination by compensating for distance variation between objects that preserves reflectance data to permit liveness determination based on the reflectance data. Traditional techniques, such as histogram equalization, increase image contrast in a fashion that alters the histogram data to prevent liveness determination.

In addition to the square law reduction in intensity, the design of the lens included in the camera acquiring the RGB/NIR data can be taken into account when performing relative distance estimation for objects in the field of view of a camera. For example, depending upon the f-number of the lens, distortion will be introduced into an image of an object based on the distance of the object from the lens. For example, a wide-angle lens (low f-number lens) will introduce distortion making a person's nose look comically large as the person's face approaches the camera lens. A wide-angle lens can expand objects near the lens and compress objects located far away depending upon the location of the object with respect to the optical axis. Other lenses, for example telecentric or rectilinear lenses, do not distort objects based on distance. Techniques disclosed herein can compensate for lens distortion by permitting parameters corresponding to the lens size, magnification and f-number to be input to the authentication system for each camera to be used. The lens parameters can be used to determine a homography matrix which can be used to perform an affine transformation on an image and compensate for distortion introduced by the lens. An affine transformation can compensate for distortion by changing pixel locations in an image by performing translations, rotations and scale changes in x and y for pixels in an image plane.

Techniques described herein perform a relative distance estimation based on measurements of pixel intensities from NIR image regions that include skin portions of a human face. These techniques are successful as long as the subject in the NIR image cooperates in making sure that skin portions of the subject's face are within unmasked regions of the NIR image. Histogram 1202 illustrates Gaussian distributions 1204, 1206 fit to raw count data from NIR image 1200 mask portion 1208. NIR image 1200 was acquired with the subject approximately 1 m (meter) from the camera. Gaussian distribution 1204 corresponds to background portions of NIR image 1200 and Gaussian distribution 1206 corresponds to NIR light reflected from the subject's facial skin.

Figure 13:
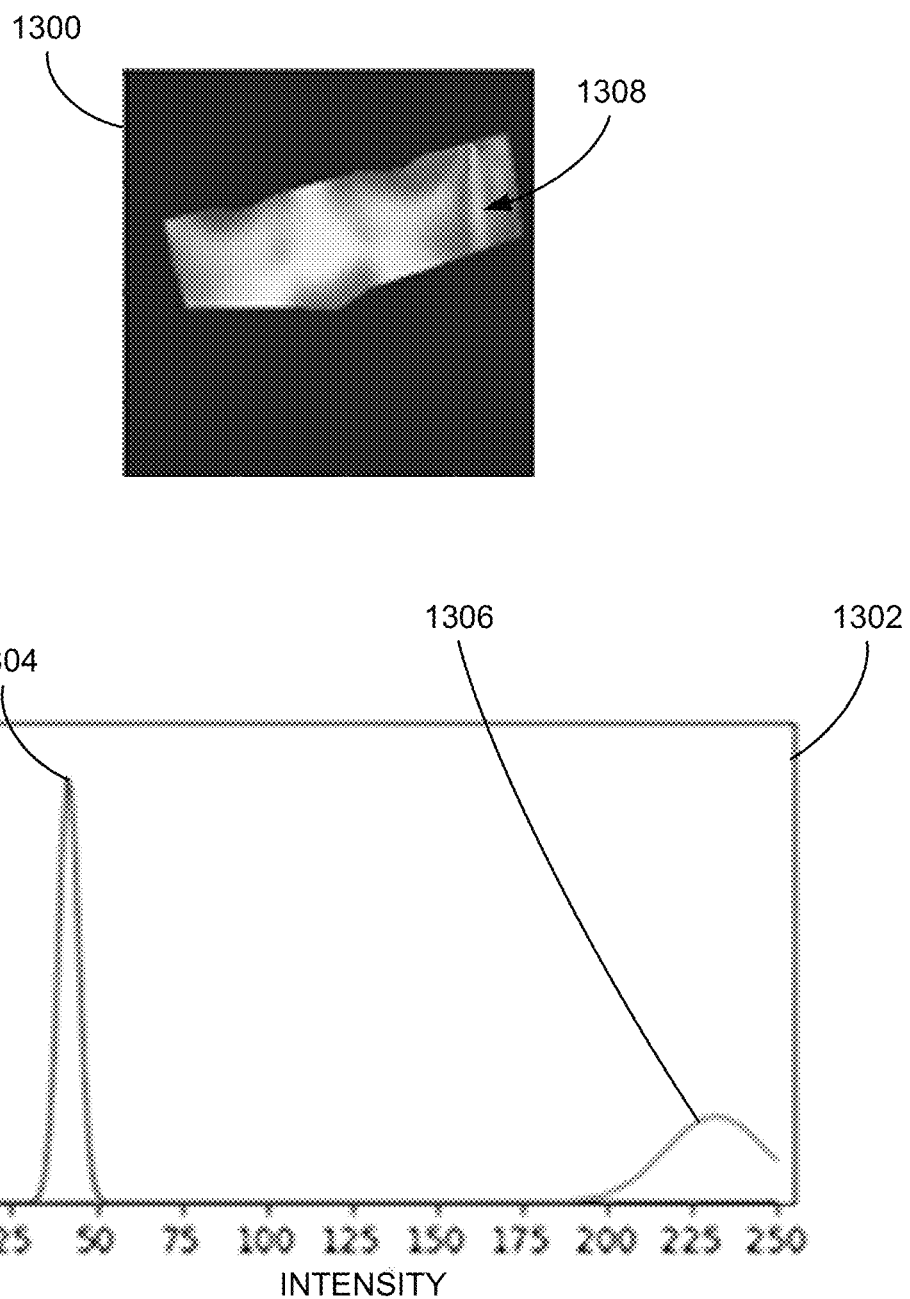
FIG. 13 is a diagram of an example masked near infrared image of a human face acquired at a second distance.

FIG. 13 is a diagram of a masked NIR image 1300 of a human face and a histogram 1302 corresponding to the unmasked portion 1308 of masked NIR image 1300. Masked NIR image 1300 and histogram 1302 correspond to an NIR image acquired with the human face at about a 0.5 meter (m) distance. Histogram 1302 illustrates Gaussian distributions 1304, 1306 fit to raw count data from NIR image 1300 mask portion 1308. Gaussian distribution 1304 corresponds to background portions of NIR image 1300 and Gaussian distribution 1306 corresponds to NIR light reflected from the subject's facial skin.

To estimate the relative distance between subjects in NIR images 1200, 1300, parameters for a Gaussian distribution of pixels on target are calculated at enrollment. Pixels on target are defined as pixels that fall within the unmasked portion 1208, 1308 of the NIR image 1200, 1300. When a subject's NIR image is presented for authentication or challenge, an inverse quadratic relationship between the Gaussian distribution means can be approximated by the equation:

$$RD = \left(\frac{\text{enrolled pixels}}{\text{challenge pixels}}\right)^{\frac{1}{2}}, \quad (5)$$

where the enrolled pixels can correspond to the actual histogram pixel intensity values or the Gaussian distribution mean and the challenge pixels can likewise correspond to the actual histogram pixel intensity values or the Gaussian distribution mean. Because the distance from the sensor of the subject at enrollment might not be known, RD is a relative measure that measures the distance from the sensor of the subject in the challenge NIR image relative to the distance from the sensor of the subject in the enrollment NIR image. The raw count data or the Gaussian distributions based on the raw histogram data in histograms 1202, 1302 can be scaled based on the calculated relative distance according to the equation:

$$LS = \beta \times \left(\left(\frac{\text{enrolled pixels}}{\text{challenge pixels}}\right)^{\frac{1}{2}}\right)^2, \quad (6)$$

where LS is the liveness scale factor used to multiply the raw count data in histograms and $\beta$ is a scale factor that can be determined empirically by experimentation with an example NIR illuminator, and example NIR camera and a plurality NIR images of subjects at a plurality of distances. If the relative distance RD is not required for other calculations, equation (4) simplifies to:

$$S = \beta \times \left(\frac{\text{enrolled pixels}}{\text{challenge pixels}}\right). \quad (7)$$

Techniques discussed in relation to FIGS. 12 and 13 scale pixel intensities in a histogram based on ratios of Gaussian parameters determined by measuring pixel intensities in acquired NIR images. Because the ratios of Gaussian parameters are determined based on acquired NIR images, an attacker may try to spoof a liveness authentication system as discussed herein by presenting an extremely large fake object at a far distance. This would decrease the subject reflectance to that of a live object while appearing as if it were still close to the camera. To mitigate this, secondary anti-spoofing methods can be utilized. Conventional techniques such as requiring eye glint, blink rate detection, natural motion detection, etc. could be incorporated. These techniques could make it significantly harder to spoof at a distance (e.g. it is very hard to print a poster sized face and fake the eye blink behaviors without extensive cooperation of the subject).

In addition, if passive distance measuring techniques are available to measure distances of objects to the sensor acquiring the NIR image distance measures so determined could be used in addition to distance estimation techniques discussed herein. Examples of passive distance measuring technologies include distance estimation using light polarization, lidar, and ultrasound. For example, lidar can determine a distance from a sensor to an object in a scene by measuring time required for a pulse of light to travel from a sensor to an object and back. Polarization techniques can measure a difference in reflected light polarization between a background and an object in an NIR image. Ultrasound sensors can measure time required for a pulse of ultrasound energy to travel from a transducer to an object and back. A distance value determined by light polarization, lidar or ultrasound can be averaged with an estimated distance value determined by techniques discussed herein to generate an estimated relative distance measure.

All of the techniques discussed herein regarding the classification of NIR image data can be subject to reinforcement learning. Reinforcement learning is performed by keeping statistics regarding the number of correct and incorrect results achieved by a liveness authentication system in use and using the statistical results to re-train the liveness authentication system. For example, assume a liveness authentication system is used to unlock a vehicle when approached by a valid user. A valid user is a user with prearranged permission to use a vehicle. In an example where the liveness authentication system fails to correctly authenticate a valid user and unlock the vehicle, the user can be forced to unlock the vehicle manually with a key or fob, or use a 2-factor authorization system such as entering a code sent to a cell phone number. When a user is forced to unlock the vehicle manually, the authentication system can store data regarding the incorrect authentication including the NIR image of the user that was incorrectly authenticated.

Determining what to do with data regarding the incorrect authentication can be based on a reward system. A reward system retrains the trained model corresponding to the authentication system depending upon the outcome of the failure to authenticate. If the potential user fails to gain access to the vehicle, it is assumed that the failed attempt was an attempted spoof, and the data is appended to a training dataset of likely spoof data. If the potential user gains access using one of the manual approaches, for example keys, fobs, or 2-factor authorization, the data is appended to a training dataset of false negatives to be corrected in the training process. The authentication system can be retrained based on the updated training dataset periodically or when the number of new images added to the training dataset exceeds a user-determined threshold. Retraining can be applied to both deterministic authentication systems based on Gaussian parameters and deep neural network-based systems.

Data regarding failure to authenticate a potential user can be federated or shared among a plurality of vehicles. The data regarding failure to authenticate can be uploaded to a cloud-based server that includes a central repository of training datasets. The uploaded NIR images and corresponding outcomes can be aggregated in updated training datasets and results of retraining based on the new data can be compared to results for the previous training. If the new training dataset improves performance, the new trained model can be pushed or downloaded to vehicles using the authentication system. Note that no personal data regarding users' identities needs to be uploaded to the cloud-based servers, only NIR images and outcomes. By federating new trained models based on training data uploaded from a plurality of vehicles, performance of an authentication system can be continuously improved over the lifetime of the system.

In addition, techniques described herein can be applied to article identification tasks which require that articles be authenticated to determine whether an article is real or counterfeit, for example. Any object having repeatable form and surface appearance can be authenticated using the techniques described herein. For example, a vehicle part can be authenticated to determine the presence of real leather or fake leather as part of an incoming part inspection process. Ambient light determination, image segmentation, and relative distance estimation as described herein can be applied to material spectroscopic techniques based on Gaussian distributions of processing using deep neural networks as described herein to authenticate articles.

Figure 14:
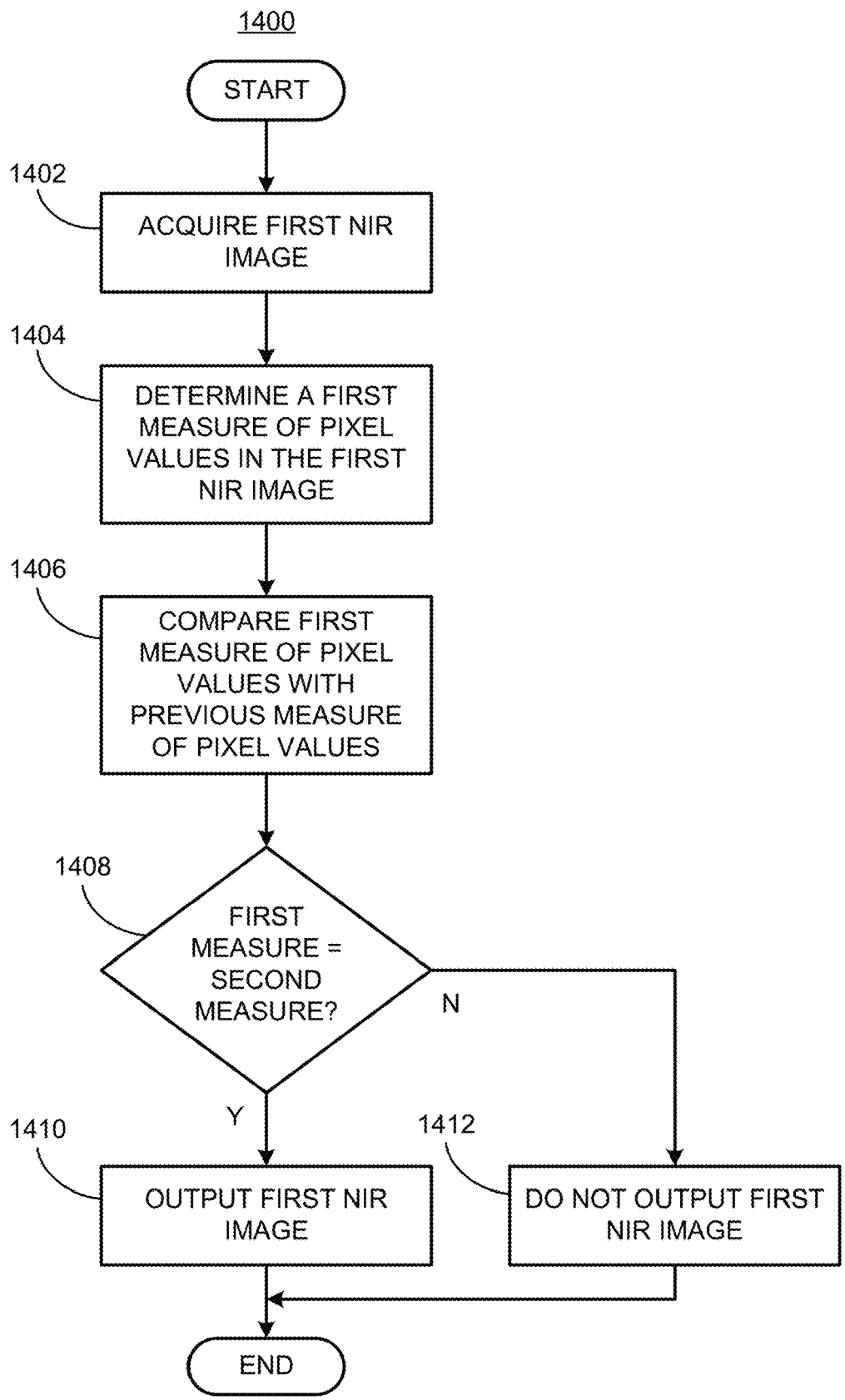
FIG. 14 is a flowchart diagram of an example process to determine near infrared images of real and fake human faces.

FIG. 14 is a diagram of a flowchart, described in relation to FIGS. 1-13, of a process for authenticating subject liveness from an NIR image. Process 1400 can be implemented by a processor of a computing device such as a computing device 110, taking as input information from sensors, and executing commands, and outputting object information, for example. Process 1400 includes multiple blocks that can be executed in the illustrated order. Process 1400 could alternatively or additionally include fewer blocks or can include the blocks executed in different orders.

Process 1400 begins at block 1402, where a computing device acquires a first NIR image of a subject, for example a human face. This corresponds to challenge image, where a first NIR image of a subject is acquired and processed to provide data to be used to test against and enrollment NIR image acquired at a previous time.

At block 1404 a first measure of pixel count values in the first NIR image is made. The first measure of pixel count data corresponds to a first histogram of pixel count data from the first NIR image. The first histogram is analyzed to determine Gaussian distribution parameters for pixels corresponding to human skin in the first NIR image as discussed above in relation to FIG. 2, above.

At block 1406 the Gaussian parameters m, $\sigma$, a, $\bar{\mu}_3$ and $\bar{\mu}_4$ corresponding to the pixel count data from the first histogram are compared to Gaussian parameters m, $\sigma$, a, $\bar{\mu}_3$ and $\bar{\mu}_4$ corresponding to pixel count data from a previous histogram. The previous histogram is a measure of pixel values determined based on an enrollment NIR image of a human subject as discussed above in relation to FIG. 2.

At block 1408 data from the first NIR image is tested to determine whether the first NIR image includes a live human subject by comparing the Gaussian parameters m, $\sigma$, a, $\bar{\mu}_3$ and $\bar{\mu}_4$ from the first NIR image (challenge NIR image) to stored Gaussian parameters m, $\sigma$, a, $\bar{\mu}_3$ and $\bar{\mu}_4$ from a previously acquired NIR image (enrollment NIR image). If the Gaussian parameters m, $\sigma$, a, $\bar{\mu}_3$ and $\bar{\mu}_4$ from the first NIR image are equal to the Gaussian parameters m, $\sigma$, a, $\bar{\mu}_3$ and $\bar{\mu}_4$ from the enrollment NIR image, within empirically determined tolerances, the first NIR image is authenticated. If the Gaussian parameters m, $\sigma$, a, $\bar{\mu}_3$ and $\bar{\mu}_4$ from the first NIR image are not equal to the Gaussian parameters m, $\sigma$, a, $\bar{\mu}_3$ and $\bar{\mu}_4$ from the enrollment NIR image, within empirically determined tolerances, the first NIR image is not authenticated.

At block 1410, the first NIR image has been authenticated for liveness and is output to a facial recognition software program for further processing to determine the identity of the subject in the first NIR image. Following block 1410 the process 1400 ends.

At block 1412, the first NIR image has not been authenticated for liveness and is not output to a facial recognition software program for further processing. Following block 1412 the process 1400 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
   a processor; and
   a memory, the memory including instructions executable by the processor to:
      acquire a first image by illuminating a first object with a first light beam;
      determine a first measure of pixel values in the image;
      perform a comparison of the first measure of pixel values to a second measure of pixel values determined from a second image of a second object, wherein the second image is previously acquired by illuminating the second object with a second light beam and wherein the first and second measures of pixel values are first and second mean values calculated on first and second histograms of pixel values calculated based on a Gaussian mixture model applied to the first and second histograms, respectively; and
      when the comparison determines that the first measure is equal to the second measure of pixel values within a tolerance, determine that the first object and the second object are a same object.

2. The computer of claim 1, wherein the first light beam is a near infrared light beam and the second light beam is a near infrared light beam.

3. The computer of claim 2, wherein the first and second images are acquired with a camera that acquires near infrared pixels, red pixels, green pixels and blue pixels.

4. The computer of claim 1, the instructions including further instructions to output the determination as to whether the first object and the second object are a same object.

5. The computer of claim 1, the instructions including further instructions to, when the comparison determines that each of the first object and the second object is a human face, perform facial recognition.

6. The computer of claim 5, the instructions including further instructions to, when facial recognition determines that each of the first object and the second object is a human face and are the same human face, operate a vehicle.

7. The computer of claim 1, the instructions including further instructions to illuminate the first object with a white light beam to acquire a first color image.

8. The computer of claim 7, the instructions including further instructions to determine a third measure of pixels values in the first color image and perform a comparison of the third measure of pixel values to a fourth measure of pixel values determined from a second color image of the second object, wherein the second color image has been previously acquired by illuminating the second object with a second white light beam.

9. The computer of claim 8, the instructions including further instructions to determine whether the first object is the same as the second object based on a comparison of the third measure of pixel values to the fourth measure of pixel values.

10. The computer of claim 9, wherein the third and fourth measures of pixel values are third and fourth mean values calculated on third and fourth histograms of pixel values included in the first color image and the second color image, respectively.

11. The computer of claim 10, wherein a first and second mean values are calculated based on a Gaussian mixture model applied to the third and fourth histograms, respectively.

12. A method, comprising:
   acquiring a first image by illuminating a first object with a first light beam;
   determining a first measure of pixel values in the image;
   performing a comparison of the first measure of pixel values to a second measure of pixel values determined from a second image of a second object, wherein the second image is previously acquired by illuminating the second object with a second light beam and wherein the first and second measures of pixel values are first and second mean values calculated on first and second histograms of pixel values calculated based on a Gaussian mixture model applied to the first and second histograms, respectively; and
   when the comparison determines that the first measure is equal to the second measure of pixel values within a tolerance, determining that the first object and the second object are a same object.

13. The method of claim 12, wherein the first light beam is a near infrared light beam and the second light beam is a near infrared light beam.

14. The method of claim 13, wherein the first and second images are acquired with a camera that acquires near infrared pixels, red pixels, green pixels and blue pixels.

15. The method of claim 12, further comprising outputting the determination as to whether the first object and the second object are a same object.

16. The method of claim 12, further comprising, when the comparison determines that each of the first object and the second object is a human face, perform facial recognition.

17. The method of claim 12, further comprising, when facial recognition determines that each of the first object and the second object is a human face and are the same human face, operate a vehicle.

18. The method of claim 12, further comprising illuminating the first object with a white light beam to acquire a first color image.

19. The method of claim 18, further comprising determining a third measure of pixels values in the first color image and perform a comparison of the third measure of pixel values to a fourth measure of pixel values determined from a second color image of the second object, wherein the second color image has been previously acquired by illuminating the second object with a second white light beam.

20. The method of claim 19, further comprising determining whether the first object is the same as the second object based on a comparison of the third measure of pixel values to the fourth measure of pixel values.

\* \* \* \* \*